(12) United States Patent
Unagami et al.

(10) Patent No.: US 12,332,998 B2
(45) Date of Patent: Jun. 17, 2025

(54) CONTROL METHOD, RECORDING MEDIUM, AND ANOMALOUS DATA SENSING SYSTEM

(71) Applicant: Panasonic Intellectual Property Corporation of America, Torrance, CA (US)

(72) Inventors: Yuji Unagami, Osaka (JP); Tomoyuki Haga, Nara (JP); Kakuya Yamamoto, Hyogo (JP); Ayaka Mitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 279 days.

(21) Appl. No.: 17/990,224

(22) Filed: Nov. 18, 2022

(65) Prior Publication Data

US 2023/0084009 A1    Mar. 16, 2023

Related U.S. Application Data

(63) Continuation of application No. PCT/JP2021/001919, filed on Jan. 20, 2021.
(Continued)

(30) Foreign Application Priority Data

Sep. 17, 2020 (JP) ................. 2020-156548

(51) Int. Cl.
*G06F 21/55* (2013.01)
*G06F 21/34* (2013.01)

(52) U.S. Cl.
CPC ............ *G06F 21/552* (2013.01); *G06F 21/34* (2013.01); *G06F 2221/034* (2013.01)

(58) Field of Classification Search
CPC .. G06F 21/552; G06F 21/34; G06F 2221/034; G06F 21/64; H04L 9/12; H04L 9/32; H04L 9/50
See application file for complete search history.

(56) References Cited

U.S. PATENT DOCUMENTS

2005/0281707 A1* 12/2005 Nakaya ................. G16H 40/40
                                                                         422/63
2009/0086630 A1*  4/2009 Hamada .............. H04L 63/0272
                                                                        370/253
(Continued)

FOREIGN PATENT DOCUMENTS

CN        108332770        7/2018
CN        110263871        9/2019
(Continued)

OTHER PUBLICATIONS

Extended European Search Report issued Oct. 5, 2023 in corresponding European Patent Application No. 21811781.0.
(Continued)

*Primary Examiner* — Khalid M Almaghayreh
(74) *Attorney, Agent, or Firm* — Wenderoth, Lind & Ponack, L.L.P.

(57) ABSTRACT

A control method for an anomalous data sensing system including at least a plurality of authentication servers and including: sensing whether data obtained from a device is not anomalous; obtaining first transaction data including information indicating the data; verifying, by a first authentication server included in the plurality of authentication servers, the first transaction data obtained, when the data is sensed as not being anomalous; and recording a block including the first transaction data into a distributed ledger when an agreement about validity of the first transaction data is reached using a consensus algorithm.

13 Claims, 14 Drawing Sheets

Related U.S. Application Data

(60) Provisional application No. 63/031,080, filed on May 28, 2020.

(56) References Cited

U.S. PATENT DOCUMENTS

| | | | |
|---|---|---|---|
| 2015/0101047 A1* | 4/2015 | Sridhara | H04L 63/145 |
| | | | 726/23 |
| 2015/0101048 A1* | 4/2015 | Sridhara | G06F 21/55 |
| | | | 726/23 |
| 2017/0135585 A1* | 5/2017 | Liu | A61B 5/7282 |
| 2017/0135593 A1* | 5/2017 | Huang | A61B 5/02438 |
| 2019/0138716 A1* | 5/2019 | Huang | H04L 41/0686 |
| 2019/0272601 A1 | 9/2019 | Unagami et al. | |
| 2019/0319861 A1* | 10/2019 | Pan | H04L 41/5019 |
| 2020/0036745 A1* | 1/2020 | Yamada | G06F 21/55 |
| 2020/0232194 A1* | 7/2020 | Periaswamy | G01F 1/32 |
| 2021/0144451 A1 | 5/2021 | Michiyama et al. | |
| 2023/0153430 A1* | 5/2023 | Jin | G06F 21/56 |
| | | | 726/23 |

FOREIGN PATENT DOCUMENTS

| | | | |
|---|---|---|---|
| CN | 114061791 A | * | 2/2022 |
| JP | 2019-133419 | | 8/2019 |
| JP | 2019-153275 | | 9/2019 |
| JP | 2020-13193 | | 1/2020 |
| JP | 2020-24515 | | 2/2020 |
| WO | 2019/064658 | | 4/2019 |
| WO | 2020/085226 | | 4/2020 |

OTHER PUBLICATIONS

International Search Report issued Apr. 6, 2021 in International (PCT) Application No. PCT/JP2021/001919.

Keidanren, "Strategy for Promoting Data Utilization to Realize Society 5.0", Dec. 12, 2017, URL: https://www.keidanren.or.jp/en/policy/2017/104.html?y=p.

* cited by examiner

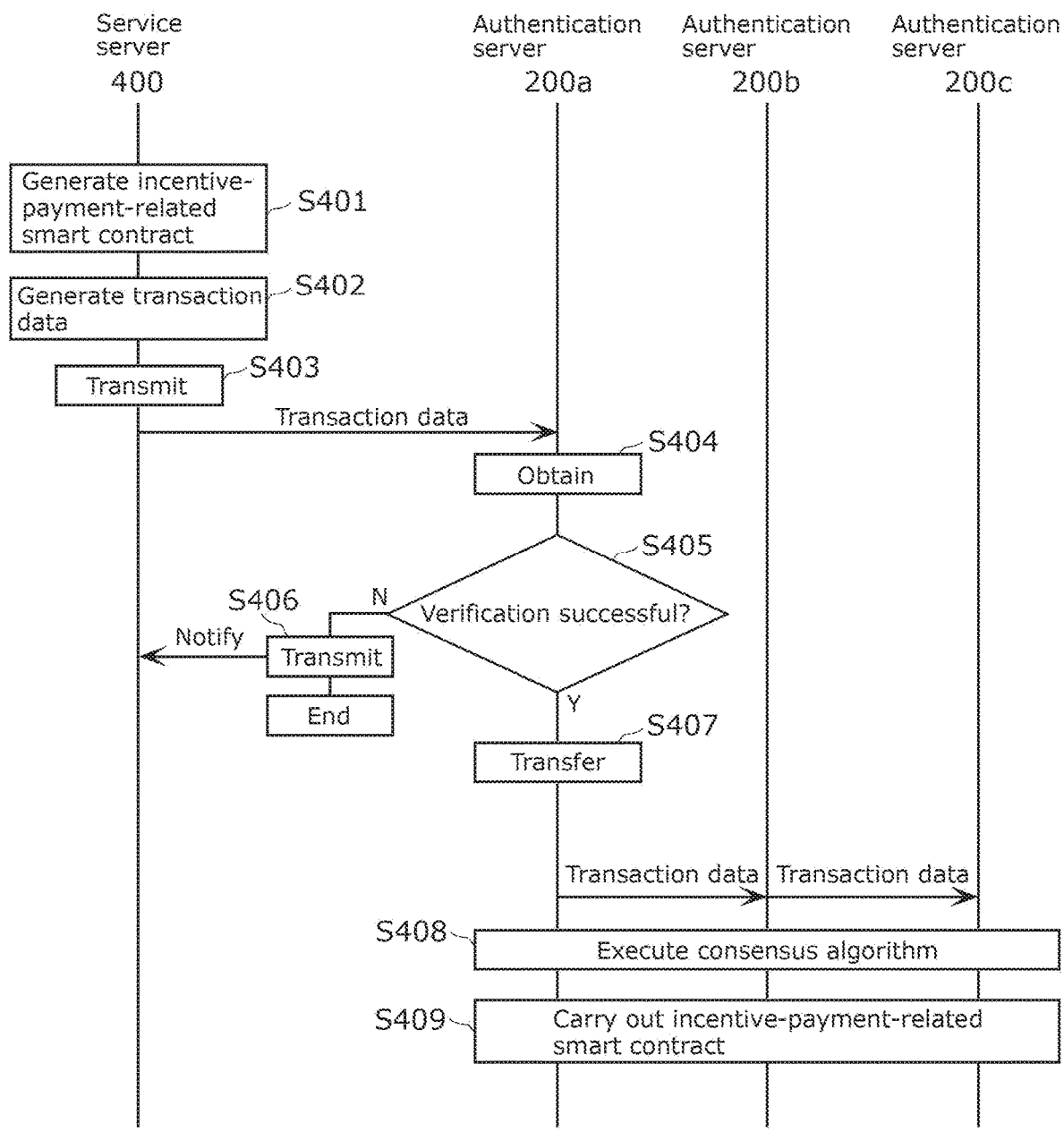

CONTROL METHOD, RECORDING MEDIUM, AND ANOMALOUS DATA SENSING SYSTEM

CROSS REFERENCE TO RELATED APPLICATIONS

This is a continuation application of PCT International Application No. PCT/JP2021/001919 filed on Jan. 20, 2021, designating the United States of America, which is based on and claims priority of U.S. Provisional Patent Application No. 63/031,080 filed on May 28, 2020 and Japanese Patent Application No. 2020-156548 filed on Sep. 17, 2020. The entire disclosures of the above-identified applications, including the specifications, drawings and claims are incorporated herein by reference in their entirety.

FIELD

The present disclosure relates to control methods, recording media, and anomalous data sensing systems.

BACKGROUND

In recent years, systems that collect, analyze, and circulate user data and device data have been considered. In the future, the Internet of things (IoT) will develop and artificial intelligence (AI), etc., will prevail, enabling collection of more data than before; therefore, there is an expectation that the data collected, for example, will be utilized.

For example, Non Patent Literature (NPL) 1 discloses Society 5.0, which is a society centered on human beings where economic development and solving of social issues are achieved at the same time using a system featuring a sophisticated fusion of cyberspace (virtual space) and physical space (real space).

NPL 1 indicates that in Society 5.0, personal data will be utilized by way of collection, etc., in tourism or healthcare, for example.

CITATION LIST

Non Patent Literature

NPL 1: Strategy for Promoting Data Utilization to Realize Society 5.0, the Internet <URL: https://www.keidanren.or.jp/en/policy/2017/104.html?v=p> [searched on May 20, 2020]

SUMMARY

Technical Problem

The data collected, for example, is recorded in a tamper-proof state using blockchains or the like and is utilized when a service is provided; however, if the data collected, for example, is abnormal or anomalous in the first place, the data cannot be utilized without fear. If services in the realm of tourism, healthcare, or the like are provided using such data, these cannot be proper services.

The present disclosure is conceived in view of the above-described circumstances and has an object to provide a control method, etc., that allow data to be utilized without fear.

Solution to Problem

In order to achieve the aforementioned object, a control method according to the present disclosure is a control method for an anomalous data sensing system including at least a plurality of authentication servers and includes: sensing whether data obtained from a device is anomalous; obtaining first transaction data generated by the device, the first transaction data including information indicating the data; verifying, by a first authentication server included in the plurality of authentication servers, the first transaction data obtained, when the data is sensed as not being anomalous; executing a consensus algorithm by the first authentication server together with a plurality of second authentication servers when the first authentication server confirms validity of the first transaction data through the verifying, the consensus algorithm being used to reach an agreement about the validity of the first transaction data, the plurality of second authentication servers being included in the plurality of authentication servers other than the first authentication server; and recording a block including the first transaction data into a distributed ledger by the first authentication server when the agreement about the validity of the first transaction data is reached using the consensus algorithm.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

According to the present disclosure, it is possible to realize a control method, etc., that allow data to be utilized without fear.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 13 is a sequence diagram illustrating an incentive-payment-related smart contract registration process performed by authentication servers and a service server according to an exemplary embodiment.

DESCRIPTION OF EMBODIMENTS

Figure 1:
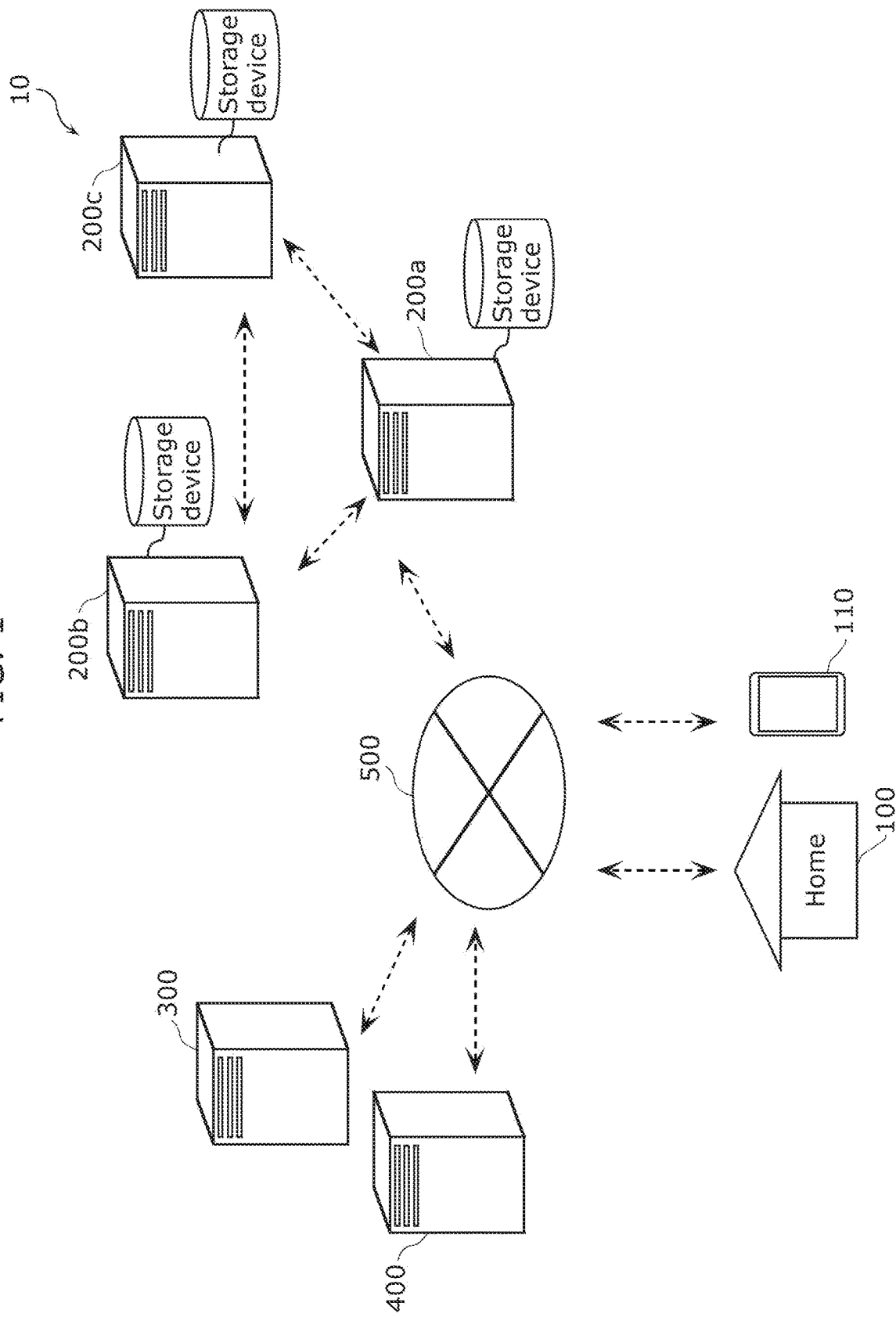
FIG. 1 is a diagram illustrating one example of the overall configuration for sensing anomalous data according to an exemplary embodiment.

A control method according to one aspect of the present disclosure is a control method for an anomalous data sensing system including at least a plurality of authentication servers and includes: sensing whether data obtained from a device is anomalous; obtaining first transaction data generated by the device, the first transaction data including information indicating the data; verifying, by a first authentication server included in the plurality of authentication servers, the first transaction data obtained, when the data is sensed as not being anomalous; executing a consensus algorithm by the first authentication server together with a plurality of second authentication servers when the first authentication server confirms validity of the first transaction data through the verifying, the consensus algorithm being used to reach an agreement about the validity of the first transaction data, the plurality of second authentication servers being included in the plurality of authentication servers other than the first authentication server; and recording a block including the first transaction data into a distributed ledger by the first authentication server when the agreement about the validity of the first transaction data is reached using the consensus algorithm.

In this manner, before recording the information related to the obtained data into the distributed ledger, it is possible to verify said data and record the information related to said data into the distributed ledger together with a notification that said data is secure. Thus, using the blockchain technology, the obtained data can be guaranteed as being secure. This allows the data to be utilized without fear using the distributed ledger.

Furthermore, the anomalous data sensing system may include a sensing server, the sensing server may perform: sensing whether the data obtained from the device is anomalous; obtaining the first transaction data from the device; and transmitting the first transaction data to the first authentication server when the data is sensed as not being anomalous, and when the first transaction data is transmitted from the sensing server to the first authentication server as the data is sensed as not being anomalous, the first authentication server may obtain the first transaction data from the sensing server and verify the first transaction data obtained.

With this, when the sensing server senses that the data is not anomalous, the first transaction data is transmitted to the first authentication server and recorded into the distribution ledger of the first authentication server. Thus, data can be guaranteed as being secure when the information related to said data is recorded in the distribution ledger of the first authentication server, allowing said data to be utilized without fear.

Furthermore, the first authentication server may perform: sensing whether the data obtained from the device is anomalous; obtaining the first transaction data from the device; and verifying the first transaction data when the data is sensed as not being anomalous.

With this, when the first authentication server senses that the data is not anomalous, the first authentication server records the first transaction data into the distributed ledger of the first authentication server. Thus, data can be guaranteed as being secure when the information related to said data is recorded in the distribution ledger of the first authentication server, allowing said data to be utilized without fear.

Furthermore, the anomalous data sensing system may further include a service server, and in the control method, the service server may generate second transaction data including a data obtainment request indicating that the data is requested to be obtained, and transmit the second transaction data to the first authentication server, and when the first authentication server obtains the second transaction data and determines, based on agreement information regarding utilization of the data that has been obtained from the device, that providing of the data to the service server is possible, the data may be provided to the service server.

Furthermore, the first authentication server may obtain third transaction data including the agreement information from the device and obtain a smart contract programmed to be able to determine, based on the agreement information, whether providing of the data is possible, and when the first authentication server obtains the second transaction data and determines, by executing the smart contract based on the third transaction data obtained, that providing of the data to the service server is possible, the data may be provided to the service server.

Furthermore, in the sensing of whether the data is anomalous, when pedometer data measured is obtained from the device as the data, and a total number of steps measured in a predetermined period of time in the pedometer data is greater than or equal to a threshold value, the data may be sensed as being anomalous.

Furthermore, in the sensing of whether the data is anomalous, when pedometer data including a total number of steps measured and position information indicating a measurement position is obtained from the device as the data, and the pedometer data includes a total number of steps measured while the position information remains unchanged for at least a predetermined amount of time, the data may be sensed as being anomalous.

Furthermore, in the sensing of whether the data is anomalous, when pedometer data including a total number of steps measured and a heart rate measured during the measurement of the steps is obtained from the device as the data, and the pedometer data includes a total number of steps measured while the heart rate remains unchanged for at least a predetermined amount of time, the data may be sensed as being anomalous.

Furthermore, in the sensing of whether the data is anomalous, when the data is obtained from the device and information indicating that the device is abnormal is obtained, the data may be sensed as being anomalous.

Furthermore, the sensing of whether the data is anomalous further may include: determining credibility of the data and including, into the information indicating the data that is included in the first transaction data obtained, the credibility determined, when the data is sensed as not being anomalous.

Furthermore, the control method may further include: generating fourth transaction data by including, into the information included in the first transaction data, a notification that the data is anomalous, when the data is sensed as being anomalous; verifying the fourth transaction data by the first authentication server when the data is sensed as being anomalous; executing a consensus algorithm by the first authentication server together with the plurality of second authentication servers when the first authentication server confirms validity of the fourth transaction data through the verifying, the consensus algorithm being used to reach an agreement about the validity of the fourth transaction data; and recording a block including the fourth transaction data into the distributed ledger by the first authentication server when the agreement about the validity of the fourth transaction data is reached using the consensus algorithm.

Furthermore, the first transaction data may include the data or a hash value of the data as the information indicating the data.

An anomalous data sensing system according to one aspect of the present disclosure includes: a plurality of authentication servers; and a sensing server. The sensing server includes: a sensor that senses whether data obtained from a device is anomalous; and a data manager that obtains first transaction data and when the data is sensed as not being anomalous, transmits the first transaction data to a first authentication server included in the plurality of authentication servers, the first transaction data being generated by the device and including information indicating the data. The first authentication server includes: a transaction data verifier that when the data is sensed as not being anomalous, verifies the first transaction data obtained; a block generator that executes a consensus algorithm together with a plurality of second authentication servers when validity of the first transaction data is verified through the verification, the consensus algorithm being used to reach an agreement about the validity of the first transaction data, the plurality of second authentication servers being included in the plurality of authentication servers other than the first authentication server; and a recorder that records a block including the first transaction data into a distributed ledger when the agreement about the validity of the first transaction data is reached using the consensus algorithm.

Hereinafter, an exemplary embodiment will be described with reference to the drawings, Note that each exemplary embodiment described below shows one specific example of the present disclosure. This means that the numerical values, shapes, materials, structural elements, the arrangement and connection of the structural elements, steps, the processing order of the steps, etc., shown in the following exemplary embodiment are mere examples of the present disclosure, and are not intended to limit the present disclosure. Among the structural elements in the following exemplary embodiment, structural elements not recited in any one of the independent claims which indicates a form of implementation according to one embodiment of the present disclosure will be described as arbitrary structural elements. The form of implementation of the present disclosure is not limited to the original independent claims and may be expressed by other independent claims.

Exemplary Embodiment

First, a system configuration according to the present disclosure will be described.

1. System Configuration

An anomalous data sensing system according to the present disclosure senses, before recording information related to obtained data into a distributed ledger, whether said data is anomalous, and records, into the distributed ledger, the information related to said data that is not anomalous. Thus, the anomalous data sensing system according to the present disclosure can guarantee, using the blockchain technology, that the obtained data is secure, allowing said data to be utilized without fear.

Hereinafter, an anomalous data sensing system, etc., according to an exemplary embodiment will be described with reference to the drawings.

1.1 Overall Configuration of Anomalous Data Sensing System 10

FIG. 1 is a diagram illustrating one example of the overall configuration of anomalous data sensing system 10 according to the present exemplary embodiment. The anomalous data sensing system includes home 100, terminal 110, authentication servers 200a, 200b, 200c, sensing server 300, and service server 400, as illustrated in FIG. 1. These are connected via communication network 500.

Authentication servers 200a, 200b, 200c (hereinafter also referred to as authentication servers 200) are each connected to a storage device including a distributed ledger in which transaction data and blocks in the blockchain are electronically recorded. Note that each of authentication servers 200 may be connected to the storage device via communication network 500 or may include the storage device therein.

Note that FIG. 1 illustrates an example where anomalous data sensing system 10 includes three authentication servers 200, but this is not limiting, Specifically, anomalous data sensing system 10 may include four or more authentication servers 200.

1.2 Configuration of Home 100

Figure 2:
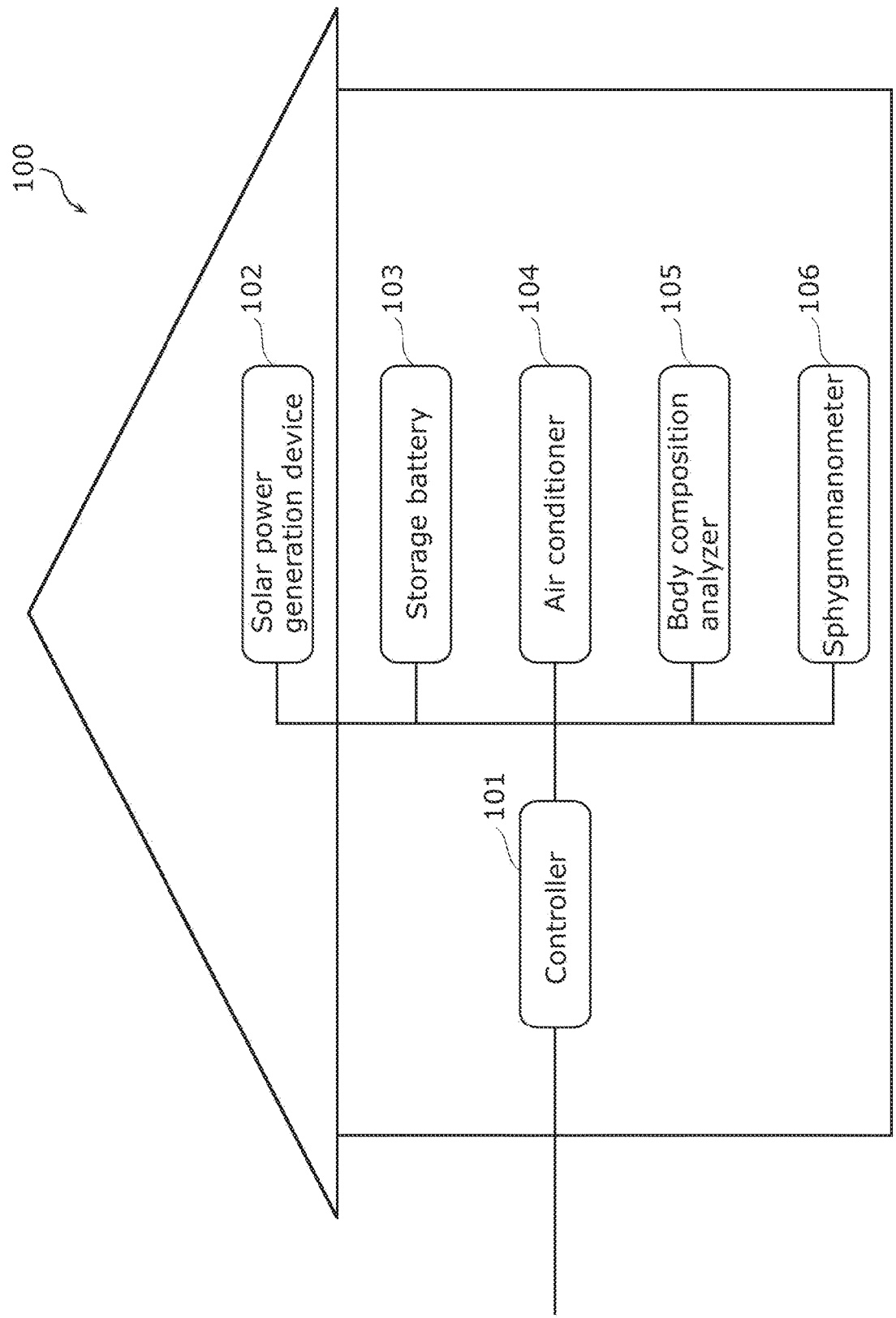
FIG. 2 is a diagram illustrating one example of the overall configuration of a home according to an exemplary embodiment.

FIG. 2 is a diagram illustrating one example of the overall configuration of home 100 according to the present exemplary embodiment.

Home 100 is one example of the device according to the present disclosure that obtains or collects data, Examples of the data to be obtained or collected may include, but no limited to, healthcare data of users such as physical examination data, sleep data, blood pressure data, body weight data, and exercise data. The data to be obtained or collected is not limited to the healthcare data, but may be user personal data including vital data such as heartbeat, or may be measurement data, or may be device history information such as records of actions of the device or records of operation of the device. It is sufficient that the data to be obtained or collected be data as just described that can be utilized by a service provider.

In the present exemplary embodiment, home 100 includes controller 101, solar power generation device 102, storage battery 103, air conditioner 104, body composition analyzer 105, and sphygmomanometer 106, as illustrated in FIG. 2. These are connected via a communication network.

<Controller 101>

Controller 101 controls home devices such as air conditioner 104, body composition analyzer 105, and sphygmomanometer 106. Furthermore, control unit 1011 may display the operating statuses of solar power generation device 102 and storage battery 103.

Furthermore, controller 101 may collect history information such as records of actions or operation of the home devices or may collect history information of the operating statuses of solar power generation device 102 and storage battery 103. Moreover, controller 101 may collect measurement data measured by the home devices.

In addition, controller 101 may transmit data such as the collected history information and measurement data to sensing server 300 or may transmit the generated transaction data to authentication servers 200.

<Solar Power Generation Device 102>

Solar power generation device 102 has a power generation mechanism for converting the sunlight directly into electric power using a solar cell. The electric power generated by solar power generation device 102 is used in home 100 or stored in storage battery 103. Note that solar power generation device 102 is not an essential element and does not need to be provided in home 100.

<Storage Battery 103>

Storage battery 103 stores the electric power generated by solar power generation device 102. Note that storage battery 103 is not an essential element and does not need to be provided in home 100.

<Air Conditioner 104, Body Composition Analyzer 105, and Sphygmomanometer 106>

Each of air conditioner 104, body composition analyzer 105, and sphygmomanometer 106 is a home device to be used by a user and may be one example of the device according to the present disclosure. For example, history information such as records of actions or operation of air conditioner 104 is transmitted to sensing server 300. History information such as records of actions or operation of body composition analyzer 105 and sphygmomanometer 106 and measurement data such as body weight data of a user measured by body composition analyzer 105 and/or blood pressure data of a user measured by sphygmomanometer 106 are also transmitted to sensing server 300. Note that the data may be transmitted to sensing server 300 via controller 101 or may be directly transmitted to sensing server 300.

Next, one example of the configuration of controller 101 will be described.

1.3 Configuration of Controller 101

Figure 3:
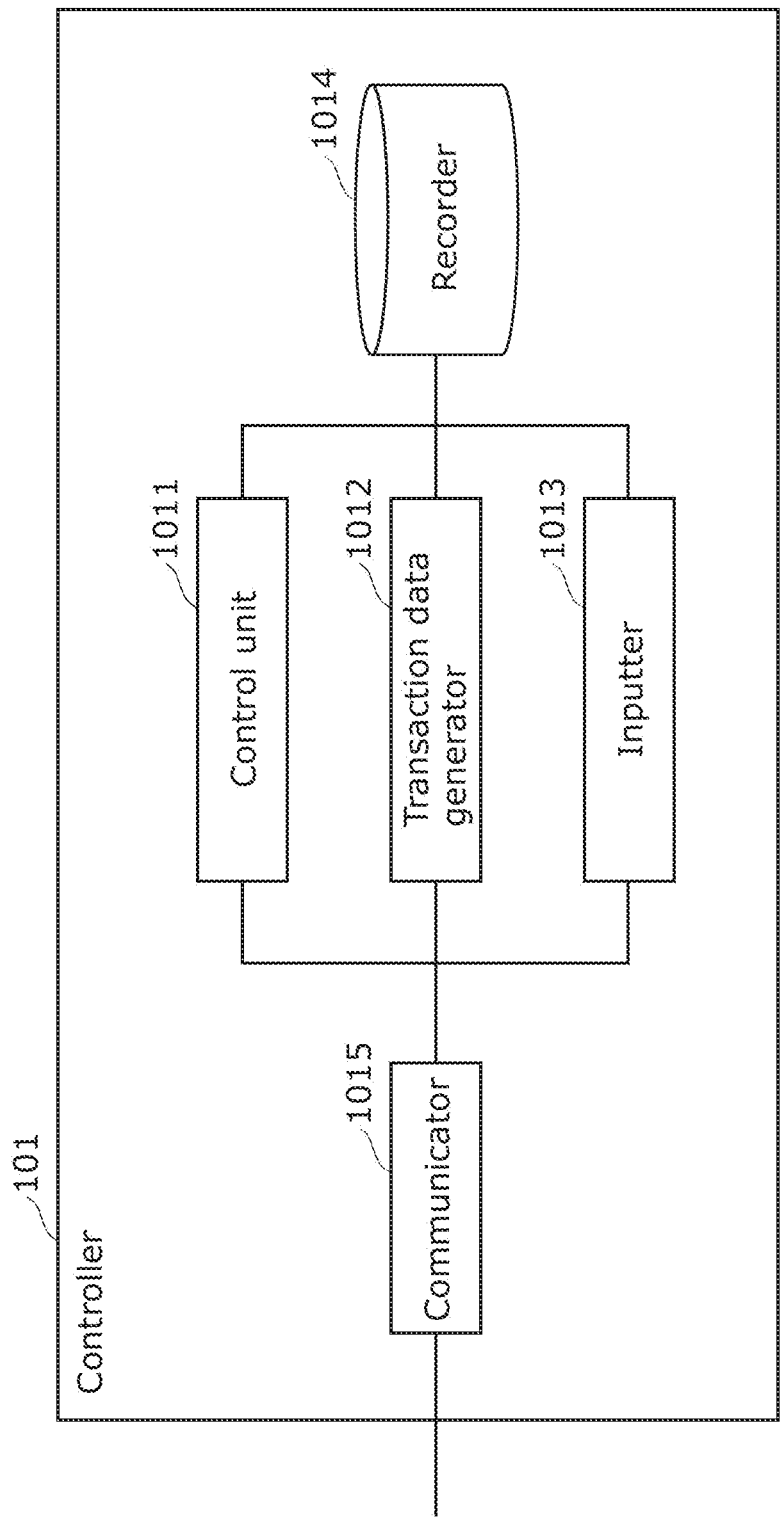
FIG. 3 is a block diagram illustrating one example of the configuration of a controller illustrated in FIG. 2.

FIG. 3 is a block diagram illustrating one example of the configuration of controller 101 illustrated in FIG. 2.

Controller 101 includes a processor (not illustrated in the drawings) and memory (not illustrated in the drawings) in which a program for causing the processor to execute predetermined processing is stored. This means that controller 101 is realized by the processor executing a predetermined program using the memory. In the present exemplary embodiment, controller 101 includes control unit 1011, transaction data generator 1012, inputter 1013, recorder 1014, and communicator 1015, as illustrated in FIG. 3.

<Control Unit 1011>

Control unit 1011 may control home devices. In the example illustrated in FIG. 2, control unit 1011 operates home devices such as air conditioner 104, body composition analyzer 105, and sphygmomanometer 106 and manages the states and the records of actions of the home devices. Furthermore, control unit 1011 may display the operating statuses of solar power generation device 102 and storage battery 103. For example, control unit 1011 may display the power generation status of solar power generation device 102 or the power storage status of storage battery 103. Furthermore, control unit 1011 may display the states of the home devices or the vital data measured by body composition analyzer 105 or sphygmomanometer 106.

Furthermore, control unit 1011 may collect history information such as records of actions or operation of the home devices or may collect history information of the operating statuses of solar power generation device 102 and storage battery 103. Moreover, control unit 1011 may collect measurement data measured by the home devices.

<Inputter 1013>

Inputter 1013 generates agreement information regarding the utilization of the data obtained or collected. Here, the agreement information indicates content agreed by a user about the utilization of the data obtained or collected and is generated on the basis of input from the user. The agreement information may be generated, for example, by selecting or deselecting an item in a list of data or a list of service providers to which data is to be provided that is provided by inputter 1013. In this case, the agreement information includes a service provider to which data can be provided as agreed by the user, data that can be provided as agreed by the user, or the type of data that can be provided as agreed by the user. In short, the agreement information includes a service provider, data, or the type of data which the user has agreed about provision. Furthermore, the agreement information may include information indicating that the user agrees about the provision when feedback is greater than or equal to a given level.

Furthermore, inputter 1013 may generate a smart contract on the basis of the generated agreement information. This smart contract is programmed to be able to determine whether data can be provided. This smart contract may include the agreement information generated by inputter 1013.

Note that inputter 1013 may be an application installed on controller 101; in this case, the installed application implements the aforementioned function of inputter 1013.

<Transaction Data Generator 1012>

Transaction data generator 1012 generates transaction data in the blockchain. In the present exemplary embodiment, transaction data generator 1012 generates transaction data including the agreement information generated by inputter 1013. More specifically, transaction data generator 1012 generates transaction data including a blockchain address owned by the user, the agreement information including a service provider, data, or the type of data which the user has agreed about provision, and a signature, for example. Note that transaction data generator 1012 may further add an identifier and generate the transaction data. Transaction data generator 1012 generates a signature using a signature generation key unique to the user.

Furthermore, transaction data generator 1012 may generate transaction data including the smart contract generated by inputter 1013. Note that transaction data generator 1012 may generate transaction data including the smart contract and the agreement information generated by inputter 1013.

Furthermore, transaction data generator 1012 may generate transaction data including information indicating data such as the history information or the measurement data collected, for example, by control unit 1011. In this case, it is sufficient that transaction data generator 1012 generate transaction data including the blockchain address owned by the user, the information indicating the data collected, for example, by control unit 1011, and the signature. The information indicating the data may be the data per se collected, for example, by control unit 1011, may be a hash value of said data, or may be attribute information of said data and the hash value of said data, for example.

The attribute information of the data may include, for example, the type of a device or a sensor that has, for example, collected said data. When the data is pedometer data, body weight data, body fat percentage data, or blood pressure data, the attribute information of the data may include a data item or the like indicating when, how, or in which item said data was measured or collected. When the data is data of a home device such as a home appliance, the attribute information of the data may include a data item indicating a record of an action thereof and the date and time of an action thereof, for example.

Transaction data generator 1012 records the generated transaction data into recorder 1014. Transaction data generator 1012 transmits the generated transaction data to authentication servers 200 or sensing server 300 via communicator 1015.

<Recorder 1014>

Recorder 1014 records data such as the history information and the measurement data collected by control unit 1011. Furthermore, recorder 1014 records the transaction data generated by transaction data generator 1012. Moreover, recorder 1014 may record the agreement information and the smart contract generated by inputter 1013.

<Communicator 1015>

Communicator 1015 communicates with authentication servers 200, sensing server 300, and service server 400 via communication network 500. This communication may be performed using transport layer security (TLS). In this case, a cryptographic key for TLS communication may be held in communicator 1015.

Next, one example of the configuration of terminal 110 will be described.

1.4 Configuration of Terminal 110

Figure 4:
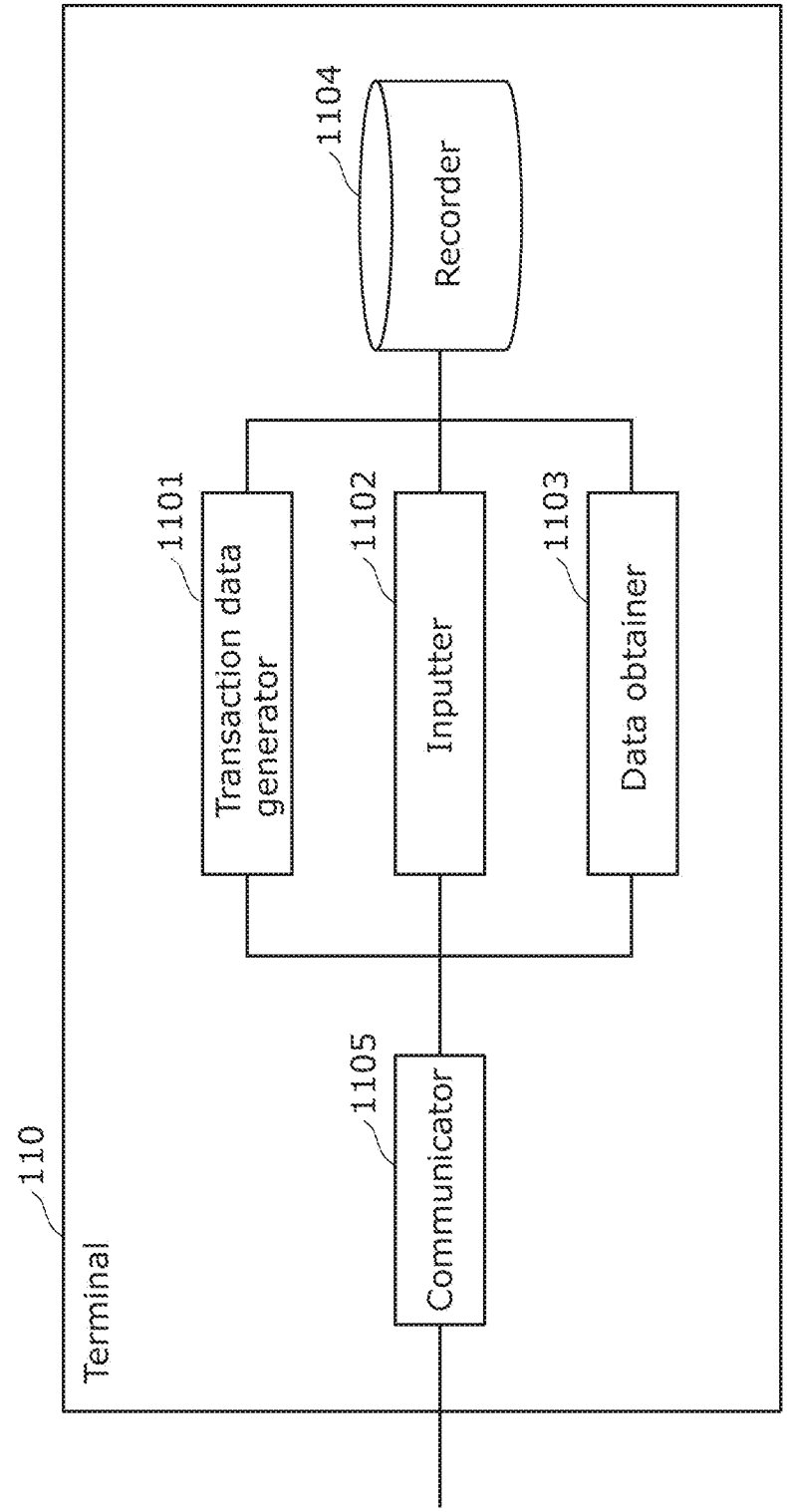
FIG. 4 is a block diagram illustrating one example of the configuration of a terminal according to an exemplary embodiment.

FIG. 4 is a block diagram illustrating one example of the configuration of terminal 110 according to the present exemplary embodiment. Terminal 110, which is one example of the device according to the present disclosure, is implemented by a processor executing a predetermined program using memory. Terminal 110 is, for example, a device including a display and an inputter such as a smartphone or a device that obtains measurement data of a user such as a wearable device.

In the present exemplary embodiment, terminal 110 includes transaction data generator 1101, inputter 1102, data obtainer 1103, recorder 1104, and communicator 1105, as illustrated in FIG. 4.

<Inputter 1102>

Inputter 1102 generates agreement information of a user regarding the utilization of data. As described above, the agreement information indicates content agreed by a user about the utilization of the data obtained or collected and is generated on the basis of input from the user.

For example, the agreement information may be generated, for example, by selecting or deselecting an item in a list of data or a list of service providers to which data is to be provided that is provided by inputter 1013. In this case, the user may select a service provider to which the data is to be provided on the basis of the purpose of utilization of the data, actual data utilization records, or feedback or an incentive to be given to the user as a result of the utilization of the data. One example of the incentive or the feedback is displaying information indicating that when a user provides data to a service provider, the service provider makes payment in cryptocurrency to the user, or displaying information of benefit to be given to the user in said case. Another example of the incentive or the feedback is displaying information indicating that when a user provides measurement data such as measurement records of a body composition analyzer or a sphygmomanometer to a fitness club, the fitness club offers the user a free trial or a discount on membership fees, or displaying information of benefit to be given to the user in said case.

Furthermore, inputter 1102 may generate, on the basis of the generated agreement information, a smart contract programmed to be able to determine whether data can be provided.

<Transaction Data Generator 1101>

Transaction data generator 1101 generates transaction data in the blockchain. In the present exemplary embodiment, transaction data generator 1101 generates transaction data in the blockchain that includes the agreement information generated by inputter 1102. More specifically, transaction data generator 1101 generates transaction data including a blockchain address owned by the user, the agreement information including a service provider, data, or the type of data which the user has agreed about provision, and a signature, for example.

Note that transaction data generator 1101 may further add an identifier and generate the transaction data. It is sufficient that transaction data generator 1101 generate a signature using a signature generation key unique to the user.

Transaction data generator 1101 may generate transaction data including information indicating the data obtained by data obtainer 1103. In this case, it is sufficient that transaction data generator 1101 generate transaction data including the blockchain address owned by the user, the information indicating the data obtained by data obtainer 1103, and the signature, for example. The information indicating the data may be the data per se obtained by data obtainer 1103, may be a hash value of said data, or may be attribute information of said data and the hash value of said data, for example.

Furthermore, transaction data generator 1101 may generate transaction data including the smart contract generated by inputter 1102. Note that transaction data generator 1101 may generate transaction data including the smart contract and the agreement information generated by inputter 1102.

Transaction data generator 1101 records the generated transaction data into recorder 1104. Transaction data generator 1101 transmits the generated transaction data to authentication servers 200 or sensing server 300 via communicator 1105.

<Data Obtainer 1103>

Data obtainer 1103 obtains data such as measurement data obtained by a sensor included in terminal 110. For example, when terminal 110 includes an acceleration sensor and a global positioning system (GPS) sensor, data obtainer 1103 obtains, as the measurement data, pedometer data including the number of steps obtained from the acceleration sensor and position information obtained from the GPS sensor. Furthermore, data obtainer 1103 may obtain blood pressure data as the measurement data or may obtain cardiac data as the measurement data. This means that data obtainer 1103 obtains data that can be utilized by a service provider.

Data obtainer 1103 records the obtained data into recorder 1104. Data obtainer 1103 may transmit the obtained data to sensing server 300 via communicator 1105.

<Recorder 1104>

Recorder 1104 records the transaction data generated by transaction data generator 1101. Furthermore, recorder 1104 records the data obtained by data obtainer 1103. Note that recorder 1104 may record the agreement information and the smart contract generated by inputter 1102.

<Communicator 1105>

Communicator 1105 communicates with authentication servers 200 and sensing server 300 via communication network 500. This communication may be performed using TLS. In this case, a cryptographic key for TLS communication may be held in communicator 1105.

Next, one example of the configuration of authentication servers 200 will be described.

1.5 Configuration of Authentication Server 200a

Figure 5:
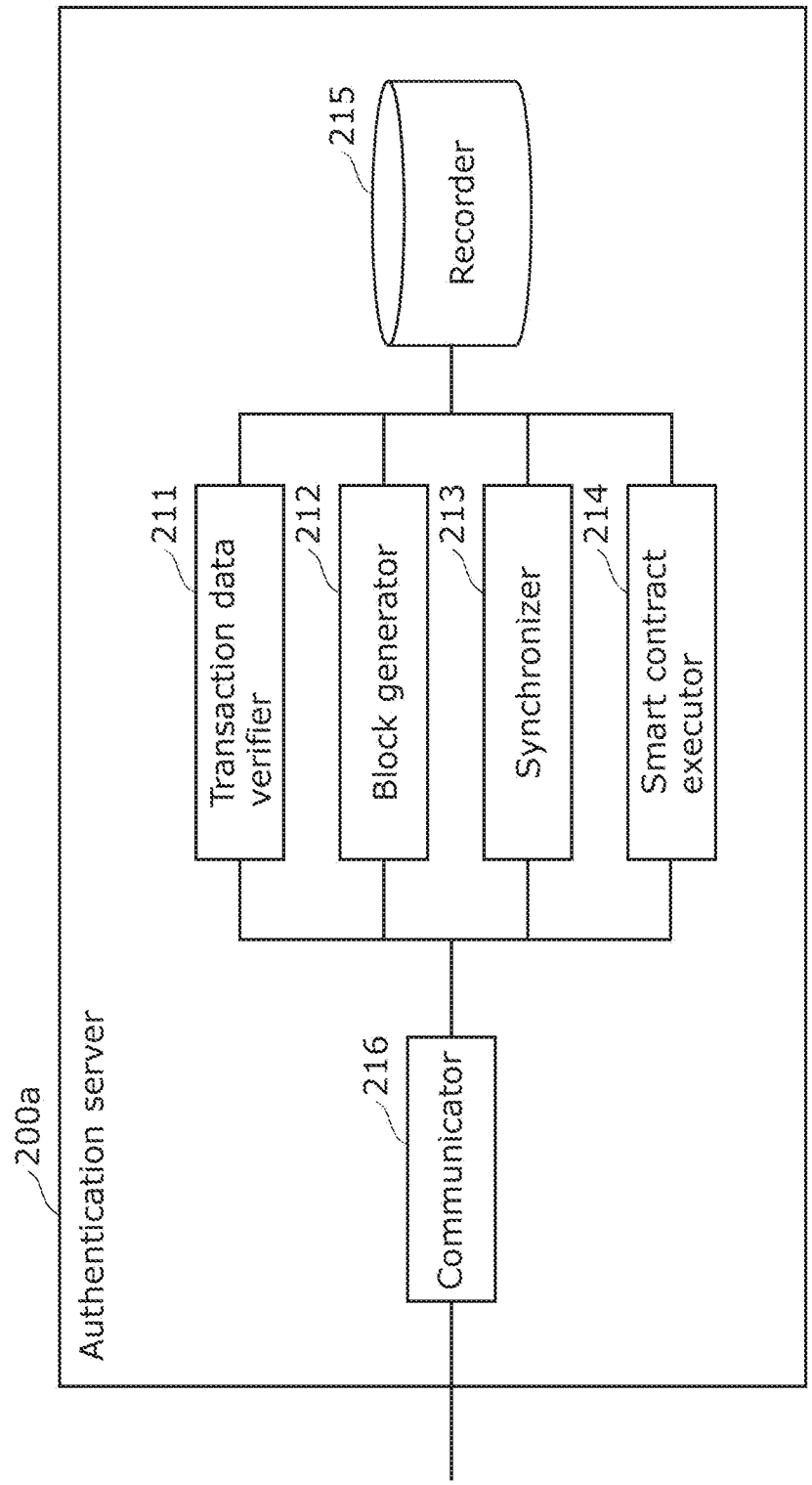
FIG. 5 is a block diagram illustrating one example of the configuration of an authentication server according to an exemplary embodiment.

FIG. 5 is a block diagram illustrating one example of the configuration of authentication server 200a according to the present exemplary embodiment. Authentication servers 200b, 200c have substantially the same configurations. Therefore, authentication server 200a will be described below as an example.

Authentication server 200a includes transaction data verifier 211, block generator 212, synchronizer 213, smart contract executor 214, recorder 215, and communicator 216, as illustrated in FIG. 5. Authentication server 200a can be implemented by a processor executing a predetermined program using memory. Hereinafter, each structural element will be described.

<Transaction Data Verifier 211>

Transaction data verifier 211 verifies the received transaction data. Specifically, when transaction data verifier 211 receives the transaction data from a device such as terminal 110 or home 100, transaction data verifier 211 verifies whether the transaction data is in proper format and whether the signature is valid. For example, when verifying the transaction data including the agreement information, transaction data verifier 211 verifies whether the address, the agreement information, and the signature included in said transaction data are valid. Note that, for example, when verifying the transaction data including the information indicating the data, it is sufficient that transaction data verifier 211 verify whether the address, the information indicating the data, and the signature included in said transaction data are valid.

In this manner, transaction data verifier 211 verifies the received transaction data by checking the validity of the transaction data.

When the verification confirms that the transaction data is valid, transaction data verifier 211 records said transaction data into recorder 215. Here, when the transaction data is determined as being valid, a notification is sent to synchronizer 213.

<Block Generator 212>

When the verification of the transaction data is successful in transaction data verifier 211, block generator 212 executes a consensus algorithm for the transaction data between the plurality of authentication servers 200. Here, a consensus algorithm called practical byzantine fault tolerance (PBFT) may be used as the consensus algorithm, or other known consensus algorithms such as proof of work (PoW) may be used as the consensus algorithm.

In the present exemplary embodiment, block generator 212 executes the consensus algorithm between authentication server 200a, authentication server 200b, and authentication server 200c. Specifically, first, block generator 212 generates a block of the blockchain including one or more pieces of transaction data. Next, block generator 212 executes the consensus algorithm. Subsequently, when an agreement is reached by execution of the consensus algorithm, block generator 212 records the generated block into recorder 215. The block generated by block generator 212 is connected to the blockchain and recorded by recorder 215.

Next, the data structure of the blockchain will be described.

Figure 6:
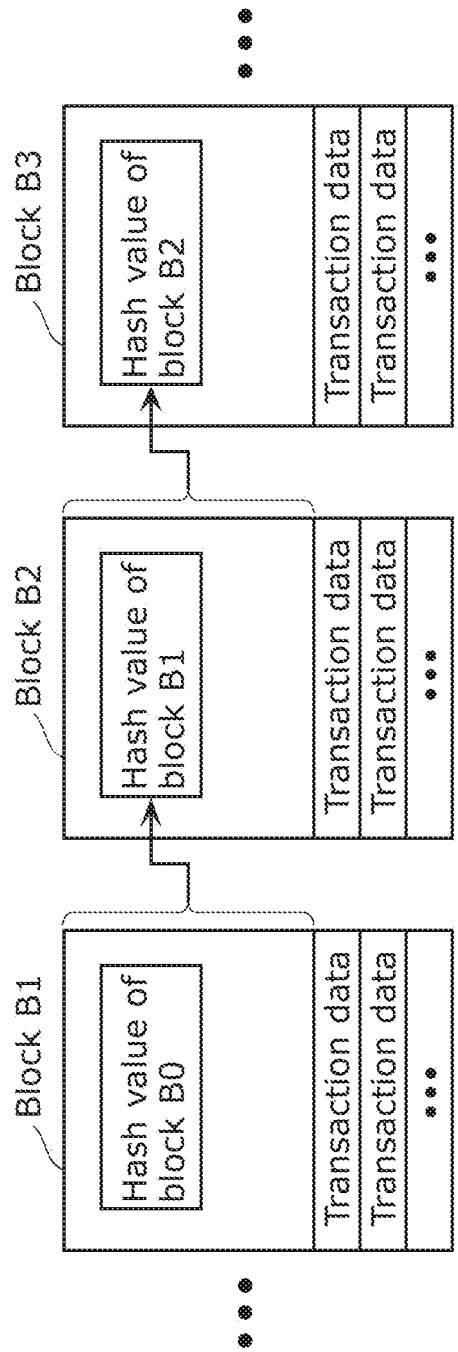
FIG. 6 is an explanatory diagram illustrating the data structure of a blockchain.

FIG. 6 is an explanatory diagram illustrating the data structure of the blockchain.

The blockchain includes blocks, each of which is a unit of recording, connected in the form of chains. Each of the blocks includes two or more pieces of the transaction data and the hash value of an immediately preceding block. Specifically, block B2 includes the hash value of block B1 located before block B2. Block B3 includes, as the hash value of block B2, a hash value calculated from the hash value of block B1 and the two or more pieces of the transaction data included in block B2. Thus, by connecting blocks in the form of chains while including the content of preceding blocks as the hash values, it is possible to effectively prevent connected transaction data from being tampered with.

If previous transaction data is changed, the hash value of the block becomes a value different from the original value, meaning that making a block that has been tampered with look like an authentic block requires modifying all the subsequent blocks, which is an unrealistically difficult task.

<Synchronizer 213>

Synchronizer 213 synchronizes the blocks of the blockchain or the transaction data between the plurality of authentication servers 200 (authentication servers 200a to 200c).

Synchronizers 213 of the plurality of authentication servers 200 perform peer-to-peer synchronization on the transaction data in the blockchain. Subsequently, synchronizers 213 record the synchronized transaction data in the blockchain into recorders 215. For example, when transaction data verifier 211 verifies that the transaction data is valid, synchronizer 213 transfers the verified transaction data to other authentication servers 200, namely, authentication servers 200b, 200c. Furthermore, when synchronizer 213 receives the verified transaction data from other authentication servers 200, synchronizer 213 records, into recorder 215, the verified transaction data that has been received.

<Smart Contract Executor 214>

Smart contract executor 214 stores the smart contract recorded in the distributed ledger into a working memory. Smart contract executor 214 executes the smart contract stored in the working memory.

For example, when transaction data including a data obtainment request is recorded into the distributed ledger, specifically, a block including said transaction data is generated and recorded into the distributed ledger, smart contract executor 214 stores the smart contract generated on the basis of the agreement information of the user into the working memory. Smart contract executor 214 executes the smart contract stored in the working memory and can thereby cause the executed smart contract to determine whether the data can be provided. The executed smart contract sends a notification indicating the result of the determination on whether the data can be provided, and grants an access right to the blockchain address included in the transaction data including the data obtainment request, for example. In this manner, smart contract executor 214 executes the smart contract as triggered by access from service server 400 and can thereby manage access from service server 400 to the data held in sensing server 300.

Furthermore, for example, when transaction data including information related to the payment of an incentive or the provision of feedback is recorded into the distributed ledger, smart contract executor 214 stores the smart contract generated on the basis of the information related to the payment of an incentive or the provision of feedback into the working memory. Smart contract executor 214 executes the smart contract stored in the working memory and can thereby cause the executed smart contract to pay an incentive or provide feedback. The payment of an incentive or the provision of feedback may be sending a notification that an incentive has been paid or feedback has been provided or may be paying an incentive to the user or providing feedback to the user.

<Recorder 215>

Recorder 215 includes the transaction data into a block and records the block into the distributed ledger for authentication server 200a. The distributed ledger may be formed inside recorder 215 or may be formed inside an external storage device for authentication server 200a.

Note that the transaction data includes transaction data received from home 100 or terminal 110.

In the present exemplary embodiment, when the validity of the transaction data received from the device according to the present disclosure is confirmed, recorder 215 records a block including said transaction data into the distributed ledger for authentication server 200a. Note that the block in the blockchain that is recorded in the distributed ledger may be made open to service server 400, home 100, or terminal 110.

<Communicator 216>

Communicator 216 communicates with home 100, terminal 110, authentication servers 200b, 200c, sensing server 300, and service server 400. This communication may be performed using TLS. In this case, a cryptographic key for TLS communication may be held in communicator 216.

In this manner, authentication server 200a performs the processes for verifying the validity of the data obtained from home 100 or terminal 110, conducting management about whether the data can be provided, and providing the data to service server 400. Note that the data obtained from home 100 or terminal 110 is recorded in sensing server 300, but is not recorded in authentication server 200a in the above description, but this is not limiting. Said data may be recorded in authentication server 200a. In this case, transaction data including said data may be recorded into the distributed ledger for authentication server 200a.

Next, sensing server 300 will be described.

1.6 Configuration of Sensing Server 300

Figure 7:
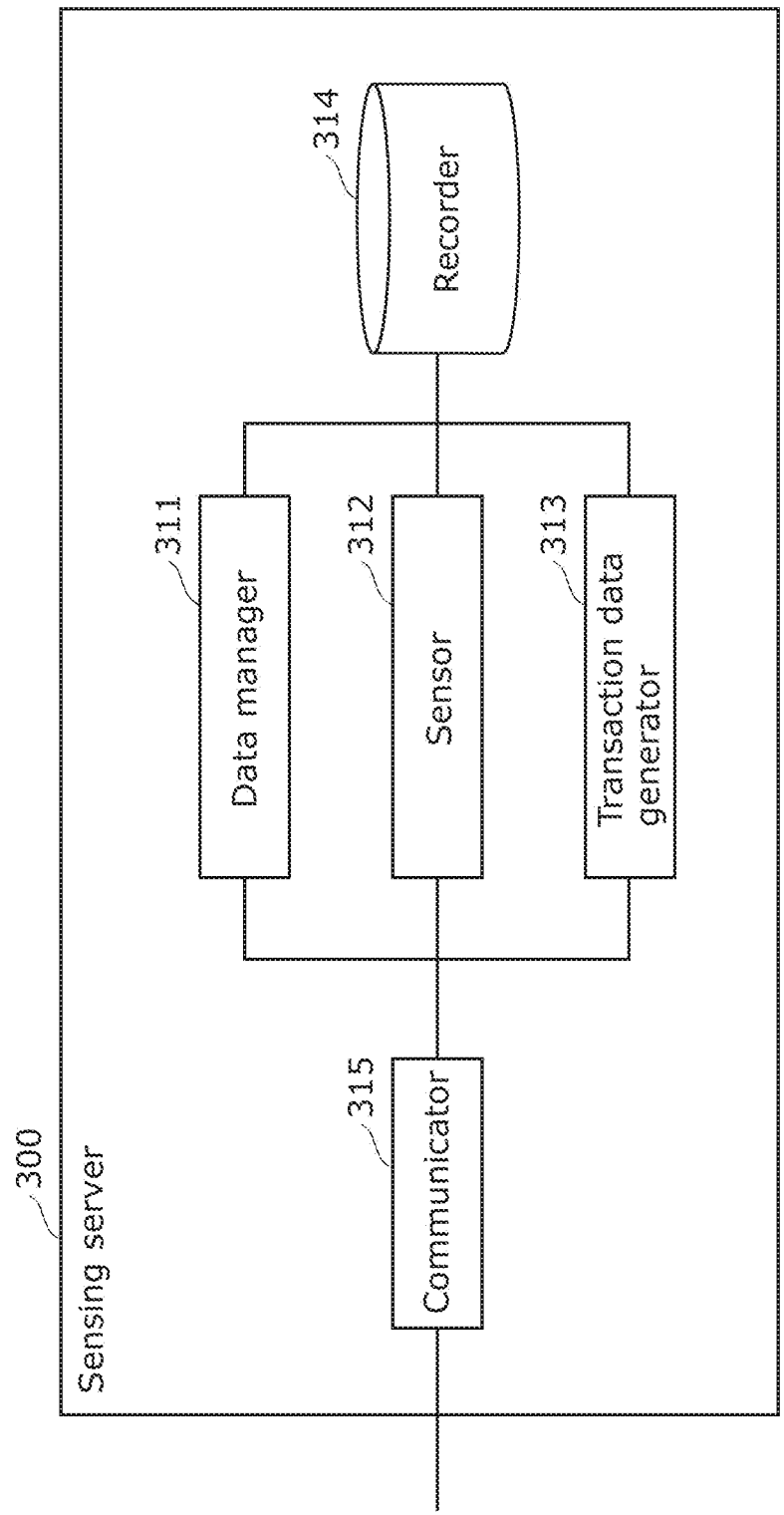
FIG. 7 is a block diagram illustrating one example of the configuration of a sensing server according to an exemplary embodiment.

FIG. 7 is a block diagram illustrating one example of the configuration of sensing server 300 according to the present exemplary embodiment.

Sensing server 300 includes data manager 311, sensor 312, transaction data generator 313, recorder 314, and communicator 315, as illustrated in FIG. 7. Sensing server 300 can be implemented by a processor executing a predetermined program using memory. Hereinafter, each structural element will be described.

<Data Manager 311>

Data manager 311 manages the data obtained from home 100 or terminal 110. Data manager 311 records, into recorder 314, the data that has been sensed by sensor 312 as not being anomalous. When sensing server 300 does not receive transaction data including information indicating the data from home 100 or terminal 110, data manager 311 transmits, to transaction data generator 313, the attribute information, etc., of the data obtained from home 100 or terminal 110. Note that the attribute information of the data may include a data item or the type of a device or a sensor that has, for example, collected said data, as mentioned above. Furthermore, data manager 311 may add, to the data that has been sensed by sensor 312 as being anomalous, information indicating that said data is anomalous, and record the resultant data into recorder 314.

Furthermore, when data manager 311 receives, from service server 400, a request to provide data, data manager 311 provides the data of the user on the basis of the agreement information recorded in the distributed ledger for authentication server 200. In the present exemplary embodiment, assume that authentication server 200 executes the smart contract generated on the basis of the agreement information and sensing server 300 receives, from authentication server 200, a notification that the data can be provided. In this case, when data manager 311 receives, from service server 400, a request to provide data, data manager 311 provides said data of the user. Note that data manager 311 may receive a blockchain address corresponding to the data requested to be provided, together with the request to provide the data, from service server 400.

<Sensor 312>

Sensor 312 senses whether the data obtained from the device such as terminal 110 or home 100 is anomalous. For example, in the case where measured pedometer data is obtained from the device such as terminal 110 or home 100, it is sufficient that when the number of steps measured in a predetermined period of time in the pedometer data is greater than or equal to a threshold value, sensor 312 sense that the pedometer data is anomalous. Specifically, when the pedometer data includes 10,000 steps or more counted in ten minutes, sensor 312 may sense that said pedometer data is anomalous. This is because persons such as users are not capable of walking 10,000 steps in ten minutes and therefore, 10,000 steps or more counted in ten minutes presumably means that the pedometer data has been improperly changed, for example, as a result of tampering, and the pedometer data can be considered anomalous.

Furthermore, when the pedometer data includes the number of steps that increases at a constant rate during a period of time greater than or equal to a threshold value, sensor 312 may sense that the pedometer data is anomalous. When the number of steps increases at a constant rate during a period of time greater than or equal to the threshold value, improper operation such as operating terminal 110, etc., including a sensor using a pendulum or the like may have been performed, meaning that the pedometer data can be considered anomalous.

Furthermore, for example, when pedometer data including the number of steps measured and position information indicating a measurement position is obtained from the device such as terminal 110 or home 100, sensor 312 may sense that the pedometer data is anomalous when the pedometer data includes the number of steps measured while the position information remains unchanged for at least a predetermined amount of time. When the number of steps increases despite no change in the position information, improper operation such as operating terminal 110, etc., including a sensor using a pendulum or the like may have been performed, meaning that the pedometer data can be considered anomalous.

Furthermore, for example, when pedometer data including the number of steps measured and the heart rate measured during the measurement of the steps is obtained from the device such as terminal 110 or home 100, sensor 312 may sense that the pedometer data is anomalous when the pedometer data includes the number of steps measured while the heart rate remains unchanged for at least a predetermined amount of time.

Furthermore, for example, when pedometer data that is being measured is obtained from the device such as terminal 110, sensor 312 may transmit, to the device such as terminal 110, a message that prompts a user to enter something. When sensor 312 fails to obtain any input result for the message from terminal 110, sensor 312 may sense that the obtained pedometer data is anomalous.

Furthermore, when measurement data of the body composition analyzer is obtained from the device such as terminal 110 or home 100, sensor 312 may sense that the obtained measurement data is anomalous when the measurement data includes a body composition measurement value that differs from the last body composition measurement value by a value greater than or equal to a threshold value.

Furthermore, when measurement data of the body composition analyzer is obtained from the device such as terminal 110 or home 100, sensor 312 may sense that the measurement data is anomalous when the measurement data changes from the last body composition measurement value by at least a threshold value within a given period of time. Specifically, when the level of blood pressure changes by at least 30 within one minute from the last measurement, sensor 312 may sense that the blood pressure measurement data is anomalous. Furthermore, when a body composition measurement value changes by at least five kilograms within one day from the last body composition measurement, sensor 312 may sense that the body composition measurement data is anomalous.

Furthermore, for example, when data is obtained from the device such as terminal 110 or home 100 and furthermore, information indicating that said device is abnormal is obtained, sensor 312 may sense that the obtained data is anomalous.

Note that sensor 312 may sense an abnormality in the device such as solar power generation device 102 or storage battery 103 included in home 100. For example, sensor 312 may obtain weather information from an external server (not illustrated in the drawings) and when the amount of power generated by solar power generation device 102 is great even in poor weather conditions, sense that solar power generation device 102 is abnormal or malfunctioning. Furthermore, for example, if the remaining power in storage battery 103 is not reduced even when the device such as air conditioner 104 installed in home 100 consumes electric power stored in storage battery 103, sensor 312 may sense that storage battery 103 is abnormal or malfunctioning.

Furthermore, in addition to sensing that the obtained data is anomalous, sensor 312 may sense that the operation is not normal or no operation is being performed due to problems such as a malfunction in the device. Specifically, when sensor 312 fails to receive data that is regularly obtained from the device such as solar power generation device 102 or storage battery 103 of home 100 or when the obtained data is abnormal data such as corrupted data, sensor 312 may sense that the device is malfunctioning.

Furthermore, sensor 312 may use data from other terminals or other homes in order to sense an anomaly in the device such as solar power generation device 102 or storage battery 103 of home 100. For example, sensor 312 may verify the amount of power generated by solar power generation device 102 that has been obtained from home 100 using the amount of power generated by a solar power generation device of a home next to home 100, and when these amounts of power generated differ by at least a threshold value, sense that solar power generation device 102 is abnormal or malfunctioning. Furthermore, the data may be verified on the basis of the data received in the past from said terminal, a device in said home, or the like and the data of the user who is using said terminal, for example.

Furthermore, sensor 312 senses that the data obtained from the device such as terminal 110 or home 100 is not anomalous, sensor 312 transmits said data to data manager 311 and records said data into recorder 314.

On the other hand, when sensor 312 senses that the data obtained from the device such as terminal 110 or home 100 is anomalous, sensor 312 may discard said data or may add, to the attributes of said data, information that said data is anomalous, and record said data into recorder 314. Furthermore, sensor 312 may transmit, to transaction data generator 313, the attribute information including the information that said data is anomalous.

Note that when sensor 312 senses that the data obtained from the device is anomalous or when sensor 312 senses an anomaly in the device, sensor 312 may transmit a notification to that effect to terminal 110 or controller 101 of home 100 and make an inquiry to the user.

<Transaction Data Generator 313>

When sensing server 300 does not receive transaction data including information indicating data from home 100 or terminal 110, but receives the attribute information of the data from data manager 311, transaction data generator 313 generates transaction data including the attribute information of the data. Transaction data generator 313 records the generated transaction data into recorder 314. Furthermore, transaction data generator 313 transmits the generated transaction data to authentication servers 200 via communicator 315.

<Recorder 314>

When data is obtained from the device according to the present disclosure such as terminal 110 or home 100, recorder 314 records the obtained data. Furthermore, recorder 314 records a sensing result indicating whether the data obtained by sensing server 300 is anomalous. Furthermore, when transaction data generator 313 generates transaction data, recorder 314 records the transaction data.

<Communicator 315>

Communicator 315 communicates with home 100, terminal 110, authentication servers 200, and service server 400 via communication network 500. This communication may be performed using TLS. In this case, a cryptographic key for TLS communication may be held in communicator 315.

In this manner, sensing server 300 senses whether the data obtained from home 100 or terminal 110 is anomalous and records said data. For example, when sensing server 300 obtains pedometer data from terminal 110 and senses that the pedometer data is not anomalous, sensing server 300 records said data and records, into authentication servers 200, information related to said data.

Note that although the present exemplary embodiment describes sensing server 300 and authentication servers 200 as independent servers, this is not limiting. The functions of sensing server 300 may be included in authentication servers 200 and work therein.

Next, one example of the configuration of service server 400 will be described.

1.7 Configuration of Service Server 400

Figure 8:
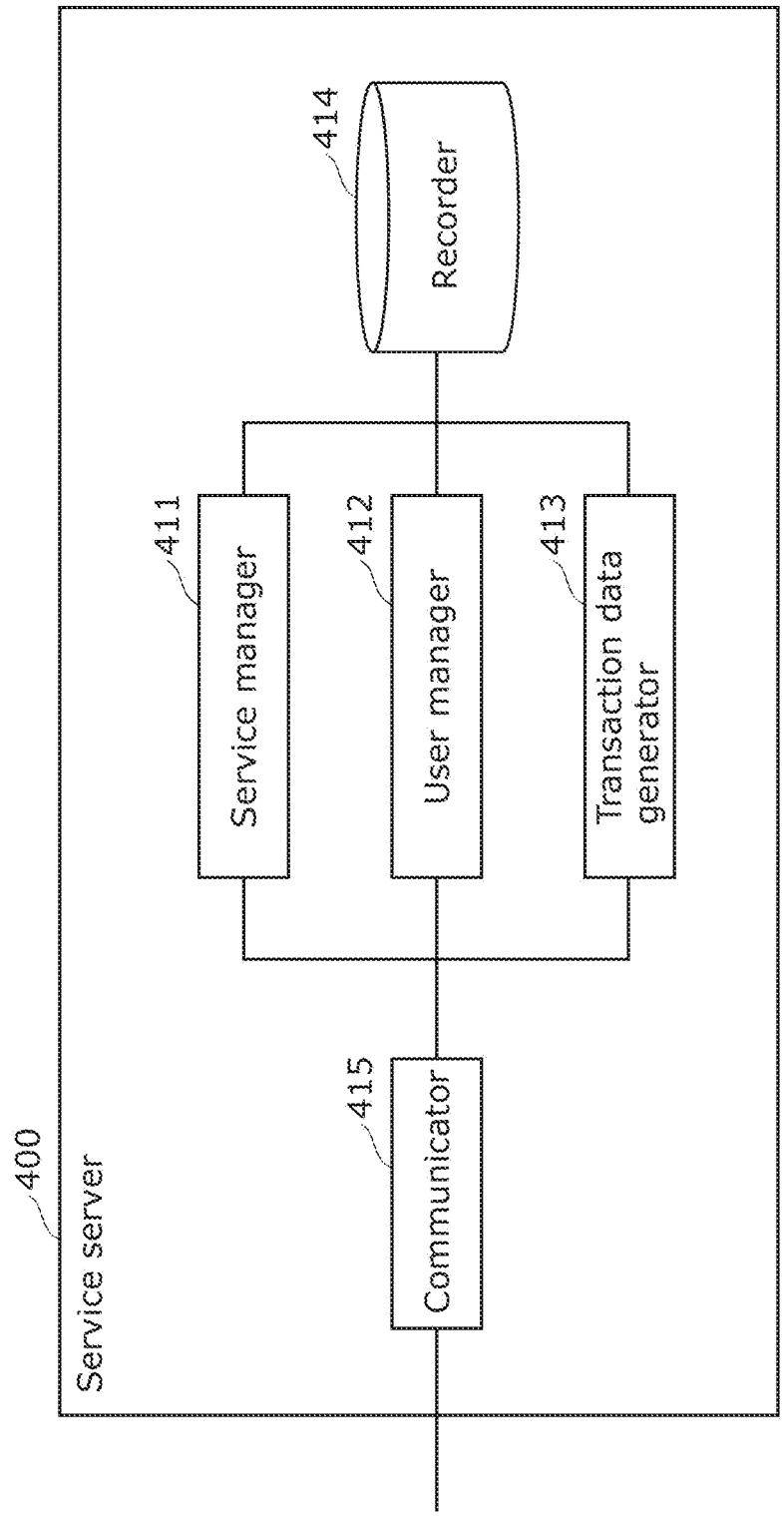
FIG. 8 is a block diagram illustrating one example of the configuration of a service server according to an exemplary embodiment.

FIG. 8 is a block diagram illustrating one example of the configuration of service server 400 according to the present exemplary embodiment.

Service server 400 is a server managed by a service provider to provide a service, which is, for example, a server for a fitness club. In the present exemplary embodiment, service server 400 includes service manager 411, user manager 412, transaction data generator 413, recorder 414, and communicator 415, as illustrated in FIG. 8. Service server 400 can be implemented by a processor executing a predetermined program using memory. Hereinafter, each structural element will be described.

<Service Manager 411>

Service manager 411 provides a service by utilizing information of a user that is managed by user manager 412. For example, service manager 411 obtains data including measurement data of the user such as a body composition measurement value or a blood pressure measurement value from sensing server 300, provides a new healthcare service, and demonstrates the effectiveness thereof.

Service manager 411 generates, using the information of the user that is managed by user manager 412, a data obtainment request indicating that the data is requested to be obtained, and transmits the data obtainment request to transaction data generator 413. For example, service manager 411 determines which data of the user needs to be obtained, and generates the data obtainment request on the basis of the attribute information of the user that needs to be obtained or the type of data that needs to be obtained. The data obtainment request may include, for example, a request designating the identifier of the user when the identifier of the user is known in advance, may include a request designating a blockchain address, or may include a request designating an attribute. The attribute herein may be the type of the device such as terminal 110 or home 100, may be the type of the data obtained from the device, or may be the attribute of the user.

Furthermore, when service manager 411 obtains data, service manager 411 generates, in exchange for the obtained data, information related to the payment of an incentive or the provision of feedback for the user whose data has been observed, and transmits the information related to the payment of an incentive or the provision of feedback to transaction data generator 413. The information related to the payment of an incentive or the provision of feedback may include a statement indicating that cryptocurrency has been paid to the blockchain address of the user in exchange for the obtained data. Note that service manager 411 may generate a smart contract on the basis of the generated information related to the payment of an incentive or the provision of feedback. In this case, the smart contract may include a program for making payment in cryptocurrency to the blockchain address of the user in exchange for the obtained data, for example.

<User Manager 412>

User manager 412 obtains the information of the user to which the service is to be provided and manages the obtained information of the user.

<Transaction Data Generator 413>

Transaction data generator 413 generates transaction data including the data obtainment request generated by service manager 411.

Furthermore, transaction data generator 413 generates transaction data including the information related to the payment of an incentive or the provision of feedback that has been generated by service manager 411.

Furthermore, transaction data generator 413 may generate transaction data including a smart contract based on the information related to the payment of an incentive or the provision of feedback that has been generated by service manager 411.

<Recorder 414>

Recorder 414 records the information of the service or the information of the user that is needed to provide the service. Furthermore, recorder 414 records the transaction data generated by transaction data generator 413. Note that recorder 414 may record the data obtainment request, the information related to the payment of an incentive or the provision of feedback, and the smart contract generated by service manager 411.

<Communicator 415>

Communicator 415 communicates with authentication servers 200 and sensing server 300 via communication network 500. This communication may be performed using TLS. In this case, a cryptographic key for TLS communication may be held in communicator 415.

1.8 Overall Sequence of Anomalous Data Sensing System 10

Figure 9:
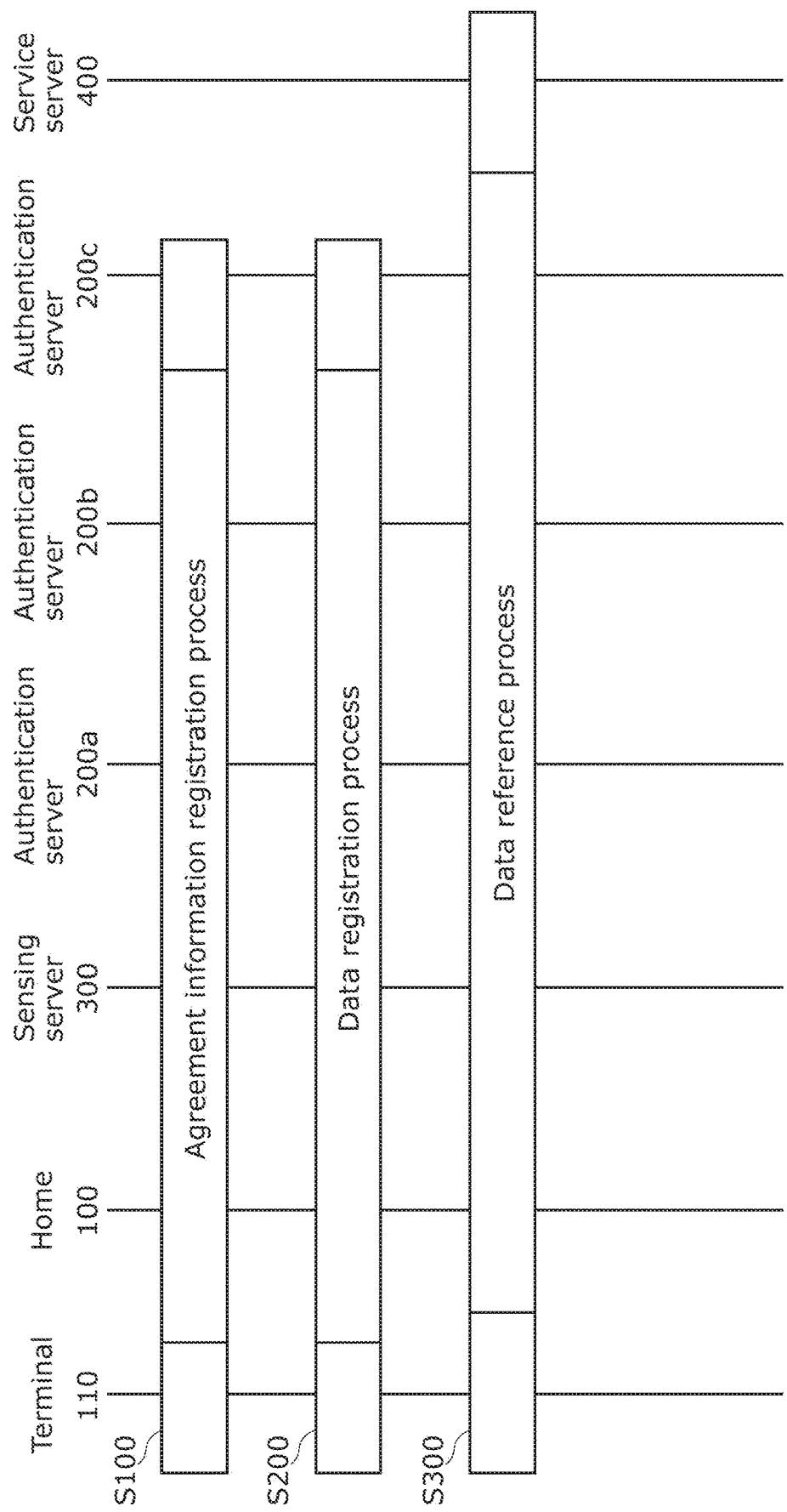
FIG. 9 is an overall sequence diagram of an anomalous data sensing system according to an exemplary embodiment.

Next, the overall sequence of anomalous data sensing system 10 will be described. FIG. 9 is an overall sequence diagram of anomalous data sensing system 10 according to the present exemplary embodiment. Each process will be described later.

First, in Step S100, terminal 110, home 100, and authentication servers 200*a* to 200*c* perform an agreement information registration process therebetween. Note that in the agreement information registration process to be described later, terminal 110 registers the agreement information. Since substantially the same process is performed in the case where controller 101 of home 100 registers the agreement information, the following description omits discussion of the case where controller 101 of home 100 registers the agreement information.

Next, in Step S200, terminal 110, home 100, authentication servers 200*a* to 200*c*, and sensing server 300 perform a data registration process therebetween. In the data registration process to be described later, data obtained from terminal 110 is registered. Since substantially the same process is performed in the case where home 100 registers data of a home device, the following description omits discussion of the case where home 100 registers data of a home device.

Next, in Step S300, terminal 110, home 100, authentication servers 200*a* to 200*c*, sensing server 300, and service server 400 perform a data reference process therebetween.

Note that the data reference process in Step S300 becomes feasible after the agreement information of the user is registered in the agreement information registration process in Step S100.

1.8.1 Agreement Information Registration Process

Next, the agreement information registration process performed by terminal 110 and authentication servers 200*a* to 200*c* will be described.

Figure 10:
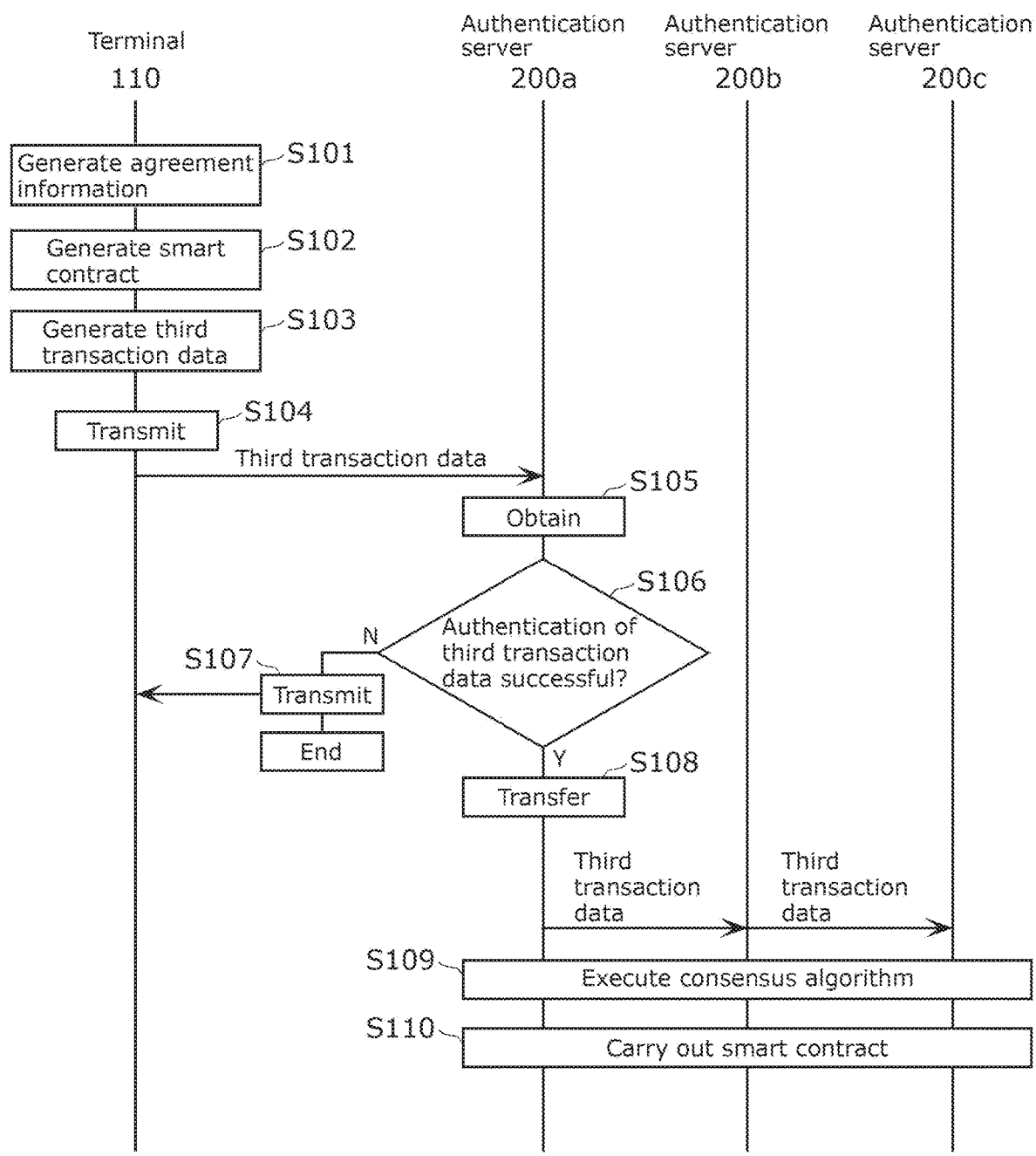
FIG. 10 is a sequence diagram illustrating an agreement information registration process performed by a terminal and authentication servers according to an exemplary embodiment.

FIG. 10 is a sequence diagram illustrating the agreement information registration process performed by terminal 110 and authentication servers 200a to 200c according to the present exemplary embodiment. The example illustrated in FIG. 10 where terminal 110 registers the agreement information will be described.

First, terminal 110 generates agreement information on the basis of input from the user (S101). An application may have been introduced into terminal 110 as inputter 1013 so that the application generates the agreement information on the basis of input from the user. In this case, the user can cause terminal 110 to generate the agreement information only by selecting or deselecting an item in a list of data or a list of service providers to which data is to be provided that is provided by inputter 1013.

Note that at the time of causing terminal 110 to generate the agreement information, the user may determine whether the amount of feedback from a service provider is large before causing terminal 110 to generate the agreement information. For example, the user may determine a service provider to which data is to be provided that is to be selected (in other words, determine to agree to provide data) on the basis of the content of feedback such as provision of cryptocurrency or provision of a coupon or discount from the service provider that is offered when the user provides the data to the service provider. Furthermore, for example, the user may determine a service provider to which data is to be provided that is to be selected (in other words, determine to agree to provide data) on the basis of the content of feedback to the user such as the amount of cryptocurrency or the amount of a coupon or discount that is offered when the user provides the data to the service provider. The content of feedback may be disclosed by the service provider or may have been recorded in the blockchain of authentication servers 200.

Next, terminal 110 generates a smart contract on the basis of the agreement information generated in Step S101 (S102). This smart contract is programmed to be able to determine whether the data can be provided. This smart contract may include the agreement information generated in Step S101. Furthermore, this smart contract may include a program that enables determination of whether the data can be provided when the feedback is greater than or equal to a predetermined level.

Next, terminal 110 generates transaction data including the agreement information and the smart contract that have been generated (hereinafter referred to as "the third transaction data") (S103).

Next, terminal 110 transmits, to authentication server 200a, the third transaction data generated in Step S103 (S104). Note that terminal 110 transmits the generated third transaction data to authentication server 200a in the example illustrated in FIG. 10, but may transmit the generated third transaction data to authentication server 200b or 200c. The same is true even when terminal 110 transmits the generated third transaction data to authentication server 200b or 200c.

Next, when authentication server 200a obtains the third transaction data from terminal 110 (S105), authentication server 200a verifies the obtained third transaction data (S106).

When the verification of the third transaction data is not successful in Step S106 (N in S106), authentication server 200a transmits a notification to that effect to terminal 110 (S107).

On the other hand, when the verification of the third transaction data is successful in Step S106 (Y in S106), authentication server 200a transfers the third transaction data to other authentication servers 200 (authentication servers 200b, 200c) (S108). Note that other authentication servers 200 also verify the third transaction data transferred thereto.

Next, authentication server 200a, authentication server 200b, and authentication server 200c execute a consensus algorithm (S109). When authentication server 200a, authentication server 200b, and authentication server 200c verify that the third transaction data is normal transaction data (that is, the validity of the third transaction data), each of authentication server 200a, authentication server 200b, and authentication server 200c generates a block including the third transaction data. Subsequently, each of authentication server 200a, authentication server 200b, and authentication server 200c records the block including the third transaction data into the distributed ledger.

In this manner, the smart contract and the agreement information generated by terminal 110 are recorded into the distributed ledger.

Subsequently, the smart contract becomes available, in other words, is carried out, as a result of being recorded into the distributed ledger (S110). Note that when the smart contract is recorded into the distributed ledger, the smart contract is stored into the working memory of authentication server 200a, etc., and thus becomes available.

1.8.2 Data Registration Process

Next, the data registration process performed by terminal 110, authentication servers 200a to 200c, and sensing server 300 will be described.

Figure 11:
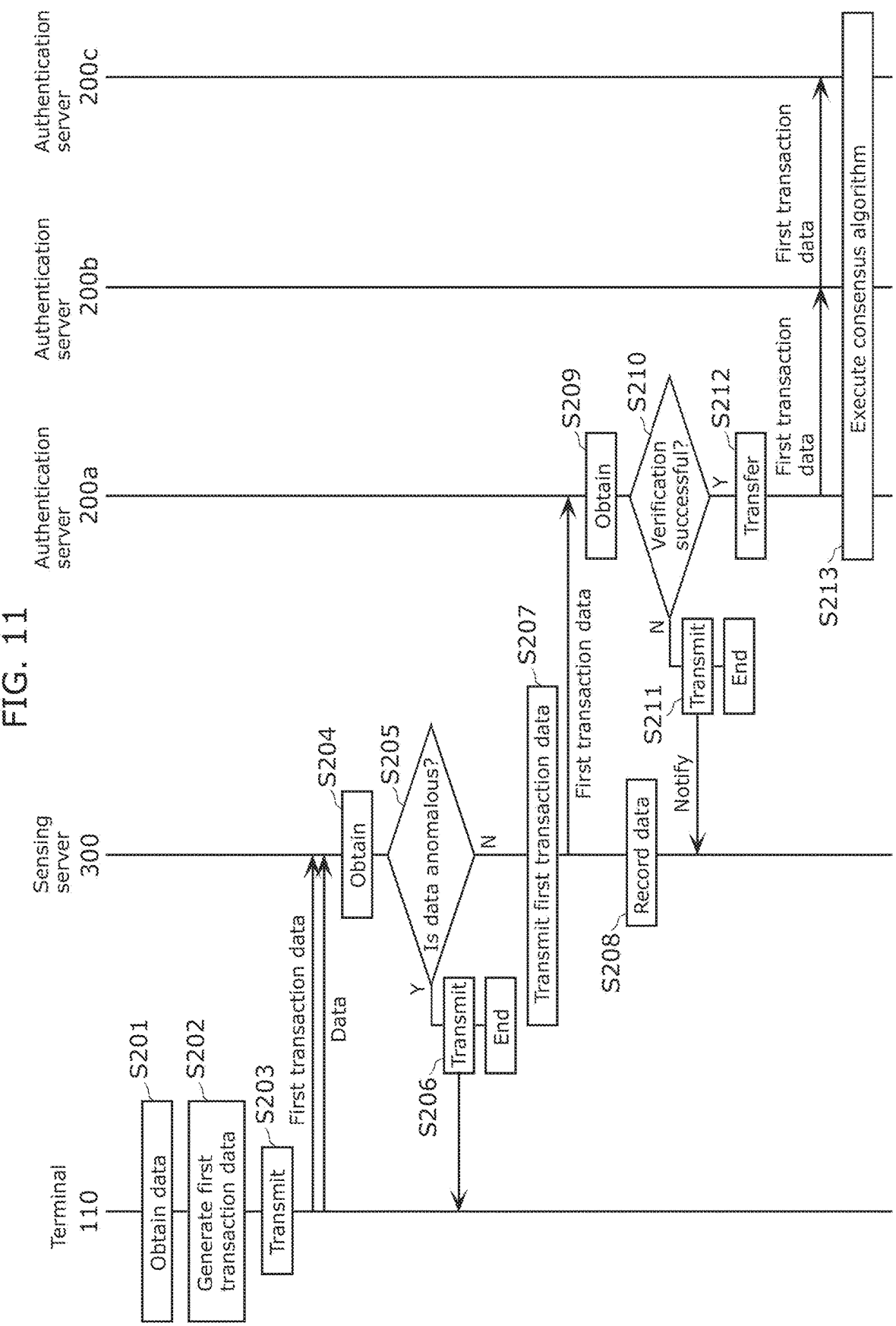
FIG. 11 is a sequence diagram illustrating a data registration process performed by a terminal, authentication servers, and a sensing server according to an exemplary embodiment.

FIG. 11 is a sequence diagram illustrating the data registration process performed by terminal 110, authentication servers 200a to 200c, and sensing server 300 according to the present exemplary embodiment. The example illustrated in FIG. 11 where the data obtained from terminal 110 is registered into sensing server 300 will be described.

First, terminal 110 obtains data such as measurement data obtained by a sensor included in terminal 110 (S201). In the case where terminal 110 is a wearable device and includes a sensor, for example, terminal 110 obtains, as said data, vital data such as pedometer data or blood pressure data, for example, obtained on the basis of the measurement data from the sensor. Note that said data is not limited to the vital data such as pedometer data or blood pressure data and may be any data as long as a service provider can utilize the data as mentioned above.

Next, terminal 110 generates transaction data including information related to the data obtained in Step S201 (hereinafter referred to as the first transaction data) (S202). Assume, for example, that the information related to the data herein is, for example, the hash value of said data and the attribute information of said data. In this case, the first transaction data includes a blockchain address, a hash value, attribute information, and a signature.

Next, terminal 110 transmits, to sensing server 300, the data obtained in Step S201 and the first transaction data generated in Step S202 (S203).

Next, when sensing server 300 obtains the first transaction data and the data from terminal 110 (S204), sensing server 300 senses whether the data obtained in Step S201 is anomalous (S205).

When the data obtained in Step S201 is anomalous in Step S205 (Y in S205), sensing server 300 transmits a notification to that effect to terminal 110 (S206).

On the other hand, when the data obtained in Step S201 is not anomalous in Step S205 (N in S205), sensing server 300 transmits, to authentication server 200a, the first transaction data obtained in Step S204. Note that terminal 110 transmits the first transaction data obtained in Step S204 to authentication server 200a in the example illustrated in FIG. 11, but may transmit the first transaction data to authentication server 200b or 200c. The same is true even when terminal 110 transmits the first transaction data to authentication server 200b or 200c.

Next, sensing server 300 records the data obtained in Step S201 (S208).

Next, when authentication server 200a obtains the first transaction data from sensing server 300 (S209), authentication server 200a verifies the obtained first transaction data (S210). Note that the order for performing Step S208 and Step S209 is not limited to this order and may be changed.

When the verification of the first transaction data is not successful in Step S210 (N in S210), authentication server 200a transmits a notification to that effect to sensing server 300 (S211).

On the other hand, when the verification of the first transaction data is successful in Step S210 (Y in S210), authentication server 200a transfers the first transaction data to other authentication servers 200 (authentication servers 200b, 200c) (S212). Note that other authentication servers 200 also verify the first transaction data transferred thereto.

Next, authentication server 200a, authentication server 200b, and authentication server 200c execute a consensus algorithm (S213). When authentication server 200a, authentication server 200b, and authentication server 200c verify that the first transaction data is normal transaction data (that is, the validity of the first transaction data), each of authentication server 200a, authentication server 200b, and authentication server 200c generates a block including the first transaction data. Subsequently, each of authentication server 200a, authentication server 200b, and authentication server 200c records the block including the first transaction data into the distributed ledger.

In this manner, the block including the first transaction data including the information related to the data is recorded into the distributed ledger, and the data itself is recorded into sensing server 300.

Note that when the data obtained in Step S201 is anomalous in Step S205 (Y in S205), sensing server 300 transmits the notification to that effect to terminal 110, but may transmit the notification to that effect to authentication server 200a as well. When transmitting the notification to that effect to authentication server 200a as well, sensing server 300 may generate transaction data indicating that the obtained data is anomalous and transmit the transaction data to authentication server 200a.

1.8.3 Data Reference Process

Next, the data reference process performed by terminal 110, authentication servers 200a to 200c, sensing server 300, and service server 400 will be described.

Figure 12A:
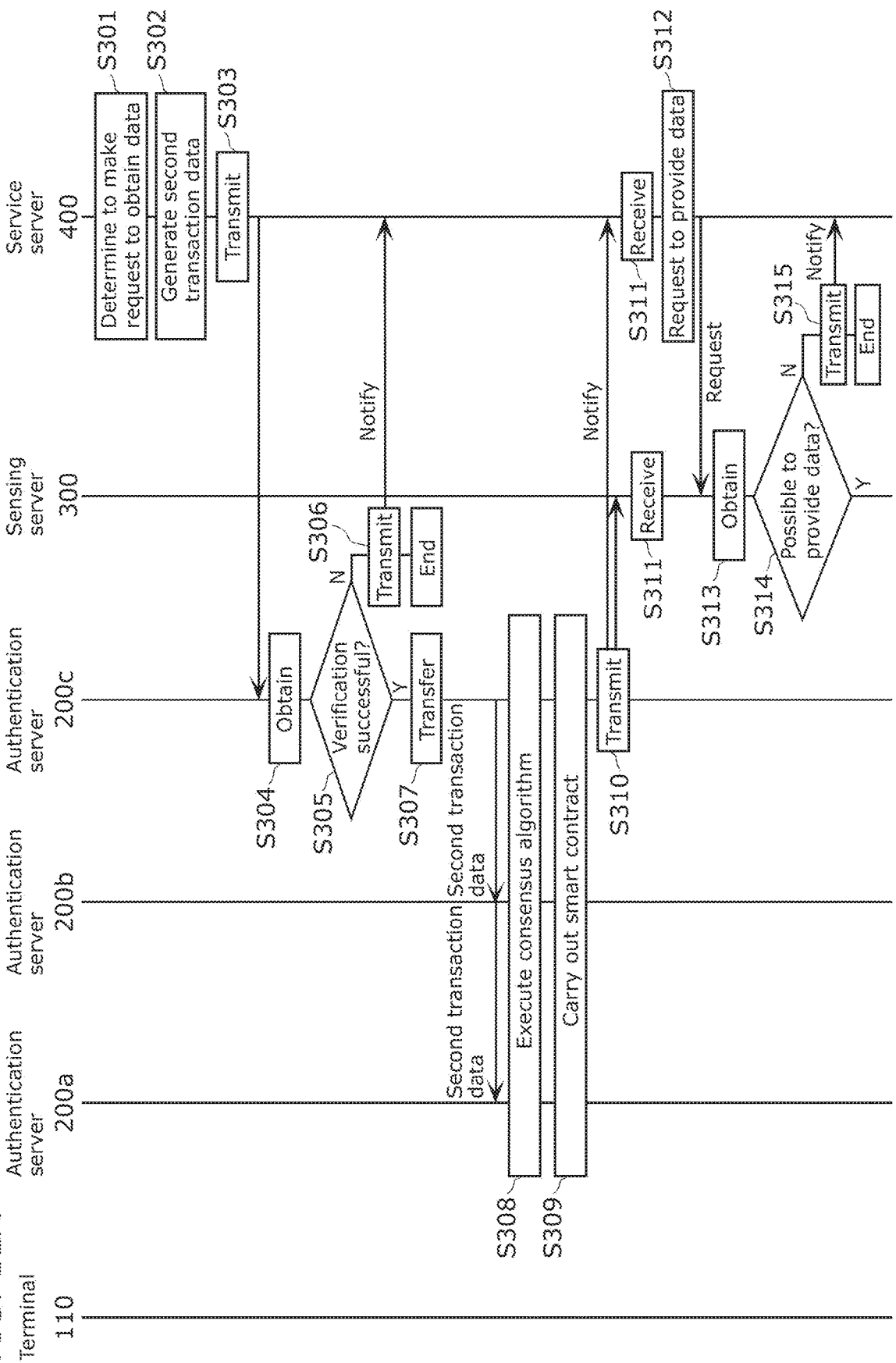
FIG. 12A is a sequence diagram illustrating a data reference process performed by a terminal, authentication servers, a sensing server, and a service server according to an exemplary embodiment.
Figure 12B:
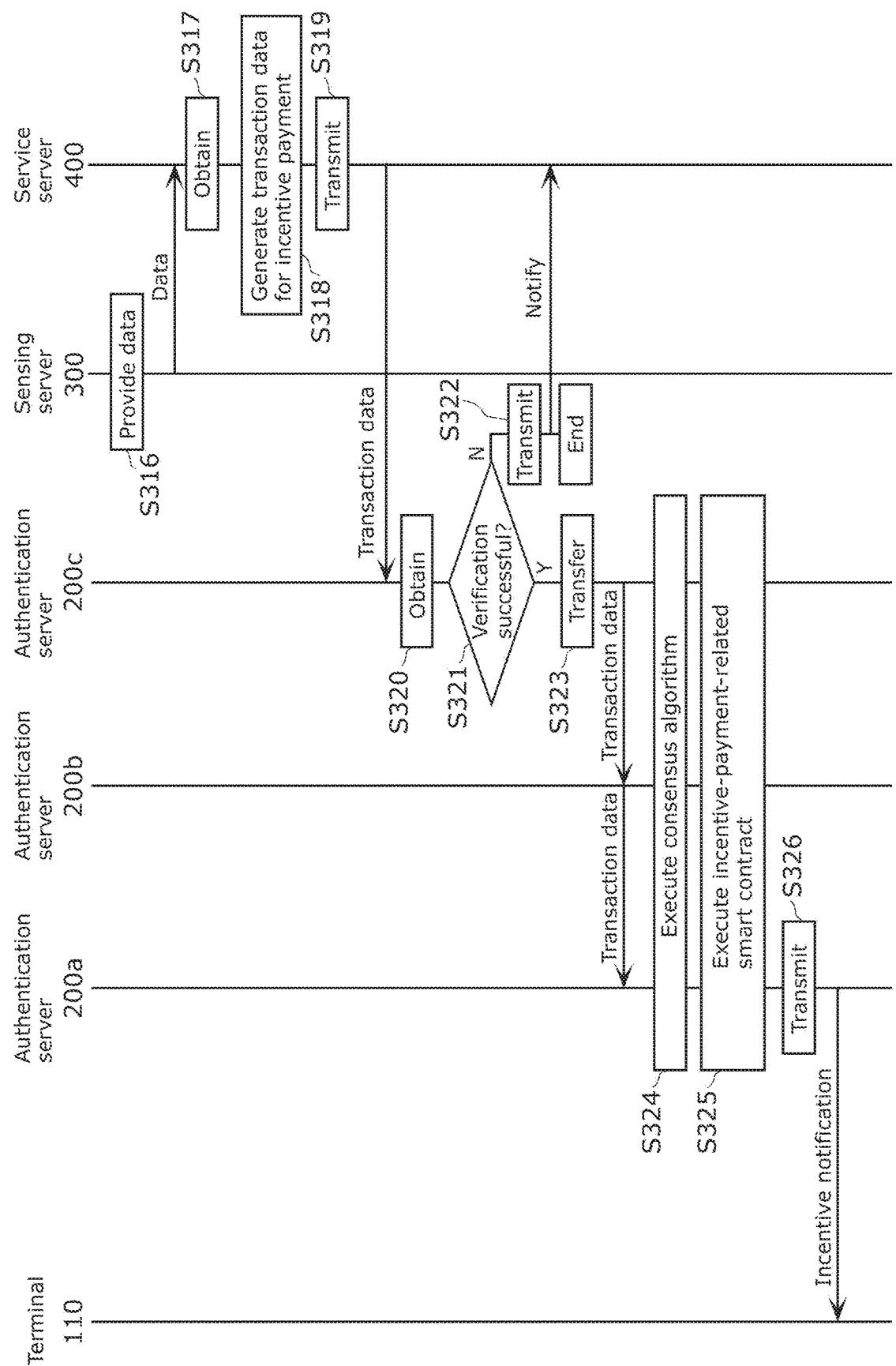
FIG. 12B is a sequence diagram illustrating a data reference process performed by a terminal, authentication servers, a sensing server, and a service server according to an exemplary embodiment.

FIG. 12A and FIG. 12B are sequence diagrams illustrating the data reference process performed by terminal 110, authentication servers 200a to 200c, sensing server 300, and service server 400 according to the present exemplary embodiment.

The example illustrated in FIG. 12A and FIG. 12B where service server 400 obtains data from sensing server 300 will be described.

First, for example, when the user determines what data is to be obtained, service server 400 determines to make a request to obtain the data (S301).

Next, service server 400 generates a data obtainment request indicating that the data is requested to be obtained, and generates transaction data including the data obtainment request (hereinafter referred to as the second transaction data) (S302).

Next, service server 400 transmits the generated second transaction data to authentication server 200c (S303). Although service server 400 transmits the second transaction data generated in Step S302 to authentication server 200c in the example illustrated in FIG. 12A, service server 400 may transmit the second transaction data to authentication server 200a or 200b. The same is true even when service server 400 transmits the second transaction data to authentication server 200a or 200b.

Next, when authentication server 200c obtains the second transaction data from service server 400 (S304), authentication server 200c verifies the obtained second transaction data (S305).

When the verification of the second transaction data is not successful in Step S305 (N in S305), authentication server 200c transmits a notification to that effect to service server 400 (S306).

On the other hand, when the verification of the second transaction data is successful in Step S305 (Y in S305), authentication server 200c transfers the second transaction data to other authentication servers 200 (authentication servers 200a, 200b) (S307). Note that other authentication servers 200 also verify the second transaction data transferred thereto.

Next, authentication server 200a, authentication server 200b, and authentication server 200c execute a consensus algorithm (S308). When authentication server 200a, authentication server 200b, and authentication server 200c verify that the second transaction data is normal transaction data (that is, the validity of the second transaction data), each of authentication server 200a, authentication server 200b, and authentication server 200c generates a block including the second transaction data. Subsequently, each of authentication server 200a, authentication server 200b, and authentication server 200c records the block including the second transaction data into the distributed ledger.

Next, authentication server 200a, authentication server 200b, and authentication server 200c execute the smart contract recorded in the distributed ledger (S309). This smart contract is generated on the basis of the agreement information and becomes available as a result of being recorded into the distributed ledger and thus stored into the working memory. Subsequently, the smart contract executed by authentication servers 200 determines, on the basis of the agreement information, whether the data requested by service server 400 can be provided. This smart contract transmits a notification indicating the determination result to sensing server 300 and service server 400 (S310).

Next, sensing server 300 and service server 400 receive the notification transmitted in Step S310 (S311). Assume that the notification transmitted in Step S310 indicates that the data requested by service server 400 can be provided.

Next, service server 400 requests sensing server 300 to provide the data (S312). Note that service server 400 may access sensing server 300 in order to obtain the data provided.

Next, when sensing server 300 obtains, from service server 400, the request to obtain the data (S313), sensing server 300 checks the notification received from authentication server 200 in Step S311 and determines whether the data requested by service server 400 can be provided (S314). Note that when the notification received from authentication server 200 in Step S311 is checked and it is determined that the data requested by service server 400 cannot be provided in Step S314 (N in S314), a notification to that effect is transmitted to service server 400 (S315).

When the notification received from authentication server 200 in Step S311 is checked and it is determined that the data requested by service server 400 can be provided in Step S314 (Y in S314), the requested data is provided to service server 400 (S316).

Next, service server 400 obtains the requested data (S317).

Service server 400 then generates transaction data for incentive payment (S318). More specifically, service server 400 generates transaction data including information related to incentive payment.

Next, service server 400 transmits the transaction data generated in Step S318 to authentication server 200c (S319). Note that service server 400 transmits the generated transaction data to authentication server 200c in the example illustrated in FIG. 12B, but may transmit the generated transaction data to authentication server 200a or 200b. The same is true even when service server 400 transmits the transaction data to authentication server 200a or 200b.

Next, when authentication server 200c obtains the transaction data from service server 400 (S320), authentication server 200c verifies the obtained transaction data (S321).

When the verification of the transaction data is not successful in Step S321 (N in S321), authentication server 200c transmits a notification to that effect to service server 400 (S322).

On the other hand, when the verification of the transaction data is successful in Step S321 (Y in S321), authentication server 200c transfers the transaction data to other authentication servers 200 (authentication servers 200a, 200b) (S323). Note that other authentication servers 200 also verify the transaction data transferred thereto.

Next, authentication server 200a, authentication server 200b, and authentication server 200c execute a consensus algorithm (S324). When authentication server 200a, authentication server 200b, and authentication server 200c verify that the transaction data is normal transaction data (that is, the validity of the transaction data), each of authentication server 200a, authentication server 200b, and authentication server 200c generates a block including the transaction data. Subsequently, each of authentication server 200a, authentication server 200b, and authentication server 200c records the block including the transaction data into the distributed ledger.

Next, authentication server 200a, authentication server 200b, and authentication server 200c execute an incentive-payment-related smart contract recorded in the distributed ledger (S325). This smart contract is generated on the basis of the incentive payment and becomes available as a result of being recorded into the distributed ledger and thus stored into the working memory. In the present exemplary embodiment, the incentive-payment-related smart contract may pay an incentive to the user.

Subsequently, for example, the smart contract in authentication server 200a transmits an incentive notification that the incentive has been paid to the user (S326).

Note that service server 400 may generate transaction data including information related to feedback provision in Step S318. In this case, a feedback-provision-related smart contract is executed in Step S325.

In this manner, terminal 110, home 100, authentication servers 200a to 200c, sensing server 300, and service server 400 perform the data reference process therebetween and then perform an incentive payment process.

Note that in the example of the data reference process illustrated in FIG. 12A, the smart contract executed by authentication server 200 transmits the determination result to sensing server 300 and service server 400 in Step S310, but this is not limiting. In Step S310, the smart contract executed by authentication server 200 may further transmit, to the user, that is, terminal 110, a notification that service server 400 is to obtain the data.

Furthermore, in the example of the data reference process illustrated in FIG. 12A, service server 400 obtains the data by obtaining the determination result from the smart contract executed by authentication server 200 and then making a request to provide the data in Steps S311 and S312, but this is not limiting. In Step S309, the smart contract executed by authentication server 200 may provide, to service server 400, the data recorded in sensing server 300 and requested by service server 400.

1.8.4 Incentive-Payment-Related Smart Contract Registration Process

Next, an incentive-payment-related smart contract registration process performed by authentication servers 200a to 200c and service server 400 will be described.

FIG. 13 is a sequence diagram illustrating the incentive-payment-related smart contract registration process performed by authentication servers 200a to 200c and service server 400 according to the present exemplary embodiment.

First, service server 400 generates an incentive-payment-related smart contract (S401).

Next, service server 400 generates transaction data including the incentive-payment-related smart contract generated in Step S401 (S402).

Next, service server 400 transmits the transaction data generated in Step S402 to authentication server 200a (S403). Service server 400 transmits the transaction data generated in Step S402 to authentication server 200a in the example illustrated in FIG. 12A, but may transmit the transaction data to authentication server 200b or 200c. The same is true even when service server 400 transmits the transaction data to authentication server 200b or 200c.

Next, when authentication server 200a obtains the transaction data from service server 400 (S404), authentication server 200a verifies the obtained transaction data (S405).

When the verification of the transaction data is not successful in Step S405 (N in S405), authentication server 200a transmits a notification to that effect to service server 400 (S406).

On the other hand, when the verification of the transaction data is successful in Step S405 (Y in S405), authentication server 200a transfers the transaction data to other authentication servers 200 (authentication servers 200b, 200c) (S407). Note that other authentication servers 200 also verify the transaction data transferred thereto.

Next, authentication server 200a, authentication server 200b, and authentication server 200c execute a consensus algorithm (S408). When authentication server 200a, authentication server 200b, and authentication server 200c verify that the transaction data is normal transaction data (that is, the validity of the transaction data), each of authentication server 200a, authentication server 200b, and authentication server 200c generates a block including the transaction data. Subsequently, each of authentication server 200a, authentication server 200b, and authentication server 200c records the block including the transaction data into the distributed ledger.

Next, the incentive-payment-related smart contract included in the transaction data becomes available, in other words, is carried out, as a result of being recorded into the distributed ledger (S409). Note that when the incentive-payment-related smart contract is recorded into the distributed ledger, the incentive-payment-related smart contract is stored into the working memory of authentication server 200a, etc., and thus becomes available.

1.9 Advantageous Effects of Exemplary Embodiment

As described above, with the control method, the recording medium, and the anomalous data sensing system according to the present disclosure, before recording the information related to the obtained data into the distributed ledger, it is possible to verify said data and record the information related to said data into the distributed ledger together with a notification that said data is secure. Thus, using the blockchain technology, the obtained data can be guaranteed as being secure. This allows the data to be utilized without fear using the distributed ledger.

Furthermore, according to the present exemplary embodiment, the agreement information of a user can be safely recorded into the distributed ledger using the blockchain technology. Moreover, according to the present exemplary embodiment, out of the data collected from the device such as terminal 110 or home 100, only the data sensed as not being anomalous can be provided to service server 400 on the basis of the agreement made by a user. This allows a service provider to utilize data of users that has been guaranteed as being secure.

Note that when information indicating that the data obtained from terminal 110 or a home device located in home 100 is sensed as not being anomalous is recorded in the distributed ledger, this certifies that terminal 110 or the home device located in home 100 is a device that provides data that is not anomalous.

2. Other Variations

Although the present disclosure has been thus far described based on the above exemplary embodiment, it goes without saying that the present disclosure is not limited to the above exemplary embodiment. The following cases are also included in the present disclosure.

(1) In the above exemplary embodiment, body composition analyzer 105 and sphygmomanometer 106 are connected to controller 100 of home 100, but this is not limiting. Body composition analyzer 105 and sphygmomanometer 106 may be wirelessly connected to terminal 110. In this case, terminal 110 may be configured to collect measurement data from body composition analyzer 105 and sphygmomanometer 106 and transmit the collected data to sensing server 300.

(2) The above exemplary embodiment describes sensing server 300 and service server 400 as being separate devices, but this is not limiting. Sensing server 300 and service server 400 may be the same device.

(3) The above exemplary embodiment describes the case where the data obtained from the device is recorded into sensing server 300, but this is not limiting. A data collection server that collects data from the device such as terminal 110 or home 100 may be provided separately from sensing server 300.

In this case, sensing server 300 may record, into the data collection server, only the data sensed as not being anomalous out of the obtained data. Furthermore, sensing server 300 may be configured to sense whether the data recorded in the data collection server is anomalous.

(4) In the above exemplary embodiment, sensor 312 of sensing server 300 performs sensing in a binary format, as exemplified by sensing whether the data obtained from the device is anomalous, but this is not limiting. When the data obtained from the device is not anomalous, sensing server 300 may further add credibility of said data. More specifically, when sensing server 300 senses that the obtained data is not anomalous, sensing server 300 may further determine credibility of said data. Subsequently, sensing server 300 may include the determined credibility into the information indicating the data included in the first transaction data obtained.

In this case, sensing server 300 may determine credibility of said data using a threshold value or may determine, as the credibility, the percentage of the data sensed as not being anomalous out of the obtained data.

Sensing server 300 may add credibility of a portion of the obtained data or the entire data. For example, suppose that 100 is given when the obtained data is sensed as not being anomalous and zero is given when the obtained data is sensed as being anomalous. In this case, sensing server 300 may determine the credibility to be 100 when the value of the currently obtained pedometer data differs from the value of the previously received pedometer data as a reference by at most 3%, determine the credibility to be 90 when the value of the currently obtained pedometer data differs from the value of the previously received pedometer data as a reference by at most 5%, and determine the credibility to be 30 when the value of the currently obtained pedometer data differs from the value of the previously received pedometer data as a reference by at least 50%.

Furthermore, when sensing server 300 adds the credibility of the data sensed as not being anomalous, service server 400 may generate second transaction data including a data obtainment request designating the credibility. This allows service server 400 to utilize only data having high credibility out of the data that is not anomalous.

Note that service server 400 may change the incentive according to the credibility of the data provided thereto.

(5) The above exemplary embodiment describes sensor 312 of sensing server 300 as being configured to sense whether the data obtained from the device is anomalous, but this is not limiting. Sensing server 300 may transfer the obtained data to another security server different from sensing server 300 and receive the result of sensing of the security server about whether the data is anomalous.

In this case, for example, the security server may include not only substantially the same function as the function of sensor 312 of sensing server 300, but also the function of collecting data from other devices such as other terminals and verifying whether the data transferred from sensing server 300 is anomalous or abnormal. This allows the security server to even verify data that cannot be verified as being or not being anomalous or abnormal only with the data obtained from one terminal. Specifically, when there is a difference in data of solar power generation devices obtained from homes in the same area where the weather is poor, the security server can verify that the data of the solar power generation device transferred thereto is anomalous or abnormal. Furthermore, the security server can verify transferred pedometer data as being anomalous or abnormal when the number of steps in the pedometer data increases significantly in a situation where walking as usual is difficult such as a snowy situation, for example. In this manner, the security server can verify data using information other than the data transferred thereto.

Furthermore, the security server may include an inputter and a display; the security server may display, on the display, the data of terminal 110 or home 100 transferred thereto and determine, on the basis of input from a surveillance person to the inputter, that the data transferred thereto is anomalous or abnormal. Moreover, on the basis of input from the surveillance person to the inputter, the security server may add credibility to the data determined as not being anomalous.

(6) The above exemplary embodiment describes sensing server 300 as being configured to sense only once whether the data obtained from the device is anomalous, but the sensing may be performed more than once. In this case, when the content of the first sensing result changes, sensing server 300 may generate transaction data indicating that the sensing result has changed and transmit the transaction data to authentication server 200. Note that the transaction data to be generated in this case preferably includes, for example, the identifier of said data or information indicating that the sensing result for said data has changed. Note that sensing server 300 may notify service server 400 of the information indicating that the sensing result for said data has changed.

(7) The above exemplary embodiment describes sensing server 300 as being configured to sense whether the data obtained from the device is anomalous, but this is not limiting. When sensing server 300 senses that the data obtained from device is not anomalous as a result of the first sensing of whether said data is anomalous, sensing server 300 tentatively determine that said data is not anomalous. Furthermore, when sensing server 300 senses that said data is not anomalous as a result of the following (second) sensing of whether said data is anomalous, sensing server 300 may definitively determine that said data is not anomalous.

In this case, if sensing server 300 cannot determine that said data is anomalous in the following sensing after a given amount of time has elapsed since the first sensing, sensing server 300 may definitively determine that said data is not anomalous. Sensing server 300 may determine the given amount of time and the number of times of sensing according to the credibility of said data tentatively determined as not being anomalous.

Note that sensing server 300 may perform the following sensing using data obtained before said data or using data obtained after the first sensing.

(8) The above exemplary embodiment describes terminal 110 as being configured to generate the agreement information, but this is not limiting. At the time of generating the agreement information, terminal 110 may set the level of data to be provided according to the agreement information. The level may be an indication of the scale of anonymization of the data that can be provided according to the agreement information. Examples of the level of the data that can be provided include an indication that the data itself (the whole data) collected from terminal 110 can be provided and an indication that among the attributes of the collected data, the gender and age of the user can be provided, but a portion of the collected data is to be anonymized when being provided.

Furthermore, the agreement information may indicate, as the level of the data that can be provided, data up to statistical data out of the collected data and indicate that the data provider is to be anonymized. In this case, suppose that authentication server 200 or sensing server 300 records which data of the data provider anonymized has been statistically compiled, for example. In this case, service server 400 may transmit an incentive for the data provision to authentication server 200 or sensing server 300 so that authentication server 200 or sensing server 300 sends the incentive to the anonymized data provider.

(9) The above exemplary embodiment describes sensing server 300 as being configured to sense whether the data obtained from the device is anomalous, but this is not limiting. Sensing server 300 may be configured to not receive data from a device when sensing server 300 continues to sense that the data obtained from the device is anomalous.

(10) The above exemplary embodiment describes sensing server 300 as being configured to sense whether the data obtained from the device is anomalous, but this is not limiting. Sensing server 300 may hold a public key certificate and a private key for each device and a signature may be added to data so that sensing server 300 determines that data without a signature is anomalous.

(11) Each of the devices according to the above exemplary embodiment is specifically a computer system configured of a microprocessor, a read only memory (ROM), a random access memory (RAM), a hard disk unit, a display unit, a keyboard, and a mouse, for example. A computer program is recorded on the RAM or the hard disk unit. Each of the devices achieves its function by way of the microprocessor operating according to the computer program. Here, the computer program is configured of a combination of command codes indicating instructions to the computer in order to achieve a predetermined function.

(12) Some or all of the structural elements included in each of the devices according to the above exemplary embodiment may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function by way of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(13) Some or all of the structural elements included in each of the devices described above may be configured from a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(14) The present disclosure may be the above-described methods. Furthermore, the present disclosure may be a computer program for implementing these methods using a computer or may be a digital signal of the computer program.

Furthermore, the present disclosure may be a computer program or a digital signal recorded on a computer-readable recording medium, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(15) The above exemplary embodiment and the above variations may be combined with each other.

INDUSTRIAL APPLICABILITY

The present disclosure can be used for control methods, programs, and anomalous data sensing systems; for example, the present disclosure can be used for a control method, a program, and an anomalous data sensing system that can sense whether data such as device history information or vital data of a user is anomalous and provide data that is not anomalous to a service provider, thus promoting data utilization.

The invention claimed is:

1. A control method for an anomalous data sensing system including a plurality of authentication servers and a sensing server, the control method comprising:
sensing, by the sensing server, whether data obtained from a device is anomalous;
obtaining, by the sensing server, first transaction data generated by the device, the first transaction data being different from the data obtained from the device, and the first transaction data including information indicating the data obtained from the device;
transmitting, by the sensing server, the first transaction data to a first authentication server included in the plurality of authentication servers, when the data obtained from the device is sensed as not being anomalous;
obtaining, by the first authentication server, the first transaction data from the sensing server, and verifying, by the first authentication server, the first transaction data obtained, when the first transaction data is transmitted from the sensing server to the first authentication server as the data obtained from the device is sensed as not being anomalous;
executing a consensus algorithm by the first authentication server together with a plurality of second authentication servers when the first authentication server confirms validity of the first transaction data through the verifying, the consensus algorithm being used to reach an agreement about the validity of the first transaction data, the plurality of second authentication servers being included in the plurality of authentication servers other than the first authentication server; and
recording a block including the first transaction data into a distributed ledger by the first authentication server when the agreement about the validity of the first transaction data is reached using the consensus algorithm.

2. The control method according to claim 1, wherein the anomalous data sensing system includes a sensing server,
the sensing server performs:
sensing whether the data obtained from the device is anomalous;
obtaining the first transaction data from the device; and
transmitting the first transaction data to the first authentication server when the data obtained from the device is sensed as not being anomalous, and
when the first transaction data is transmitted from the sensing server to the first authentication server as the data obtained from the device is sensed as not being anomalous, the first authentication server obtains the first transaction data from the sensing server and verifies the first transaction data obtained.

3. The control method according to claim 1, wherein the anomalous data sensing system further includes a service server, and
in the control method,
the service server generates second transaction data, and transmits the second transaction data to the first authentication server, the second transaction data including a data obtainment request indicating that a request has been made for data from the device, and
when the first authentication server obtains the second transaction data and determines, based on agreement information regarding utilization of the data obtained from the device, that providing of the data obtained from the device to the service server is possible, the data obtained from the device is provided to the service server, the agreement information being obtained from the device.

4. The control method according to claim 3, wherein the first authentication server obtains third transaction data including the agreement information from the device and obtains a smart contract programmed to be able to determine, based on the agreement information, whether providing of the data obtained from the device is possible, and
when the first authentication server obtains the second transaction data and determines, by executing the smart contract based on the third transaction data obtained, that providing of the data obtained from the device to the service server is possible, the data obtained from the device is provided to the service server.

5. The control method according to claim 1, wherein
in the sensing of whether the data obtained from the device is anomalous,
when pedometer data measured is obtained from the device as the data obtained from the device, and a total number of steps measured in a predetermined period of time in the pedometer data is greater than or equal to a threshold value, the data obtained from the device is sensed as being anomalous.

6. The control method according to claim 1, wherein
in the sensing of whether the data obtained from the device is anomalous,
when pedometer data including a total number of steps measured and position information indicating a measurement position is obtained from the device as the data obtained from the device, and the pedometer data includes a total number of steps measured while the position information remains unchanged for at least a predetermined amount of time, the data obtained from the device is sensed as being anomalous.

7. The control method according to claim 1, wherein
in the sensing of whether the data obtained from the device is anomalous,
when pedometer data including a total number of steps measured and a heart rate measured during the measurement of the steps is obtained from the device as the data obtained from the device, and the pedometer data includes a total number of steps measured while the heart rate remains unchanged for at least a predetermined amount of time, the data obtained from the device is sensed as being anomalous.

8. The control method according to claim 1, wherein
in the sensing of whether the data obtained from the device is anomalous,
when the data obtained from the device is obtained from the device and information indicating that the device is abnormal is obtained, the data obtained from the device is sensed as being anomalous.

9. The control method according to claim 1, wherein
the sensing of whether the data obtained from the device is anomalous further includes:
determining credibility of the data obtained from the device and including, into the information indicating the data that is included in the first transaction data obtained, the credibility determined, when the data obtained from the device is sensed as not being anomalous.

10. The control method according to claim 1, further comprising:
generating fourth transaction data by including, into the information included in the first transaction data, a notification that the data obtained from the device is anomalous, when the data obtained from the device is sensed as being anomalous;
verifying the fourth transaction data by the first authentication server when the data obtained from the device is sensed as being anomalous;
executing a consensus algorithm by the first authentication server together with the plurality of second authentication servers when the first authentication server confirms validity of the fourth transaction data through the verifying, the consensus algorithm being used to reach an agreement about the validity of the fourth transaction data; and
recording a block including the fourth transaction data into the distributed ledger by the first authentication server when the agreement about the validity of the fourth transaction data is reached using the consensus algorithm.

11. The control method according to claim 1, wherein
the first transaction data includes the data obtained from the device or a hash value of the data obtained from the device as the information indicating the data.

12. A non-transitory computer-readable recording medium having recorded thereon a program for causing a computer to perform a control method for an anomalous data sensing system including a plurality of authentication servers and a sensing server, the control method comprising:
sensing, by the sensing server, whether data obtained from a device is anomalous;
obtaining, by the sensing server, first transaction data generated by the device, the first transaction data being different from the data obtained from the device, and the first transaction data including information indicating the data obtained from the device;
transmitting, by the sensing server, the first transaction data to a first authentication server included in the plurality of authentication servers, when the data obtained from the device is sensed as not being anomalous;
obtaining, by the first authentication server, the first transaction data from the sensing server, and verifying, by the first authentication server, the first transaction data obtained, when the first transaction data is transmitted from the sensing server to the first authentication server as the data obtained from the device is sensed as not being anomalous;
executing a consensus algorithm by the first authentication server together with a plurality of second authentication servers when the first authentication server confirms validity of the first transaction data through the verifying, the consensus algorithm being used to reach an agreement about the validity of the first transaction data, the plurality of second authentication servers being included in the plurality of authentication servers other than the first authentication server; and
recording a block including the first transaction data into a distributed ledger by the first authentication server when the agreement about the validity of the first transaction data is reached using the consensus algorithm.

13. An anomalous data sensing system comprising:
a plurality of authentication servers; and
a sensing server, wherein
the sensing server includes:
a sensor that senses whether data obtained from a device is anomalous; and
a data manager that obtains first transaction data and when the data obtained from the device is sensed as not being anomalous, transmits the first transaction data to a first authentication server included in the plurality of authentication servers, the first transaction data being generated by the device, the first transaction data being different from the data obtained from the device, and the first transaction data including information indicating the data, and
the first authentication server includes:
a transaction data verifier that when the data obtained from the device is sensed as not being anomalous, verifies the first transaction data obtained;
a block generator that executes a consensus algorithm together with a plurality of second authentication servers when validity of the first transaction data is verified through the verification, the consensus algorithm being used to reach an agreement about the validity of the first transaction data, the plurality of second authentication servers being included in the plurality of authentication servers other than the first authentication server; and a recorder that records a block including the first transaction data into a distributed ledger when the agreement about the validity of the first transaction data is reached using the consensus algorithm.

\* \* \* \* \*